(12) United States Patent
Krivitski et al.

(10) Patent No.: US 12,465,675 B2
(45) Date of Patent: Nov. 11, 2025

(54) METHOD AND APPARATUS FOR IDENTIFYING DISRUPTION OF A FLUID CONNECTION BETWEEN AN EXTRACORPOREAL CIRCUIT AND A PATIENT CIRCULATORY SYSTEM

(71) Applicant: Transonic Systems Inc., Ithaca, NY (US)

(72) Inventors: Nikolai M. Krivitski, Ithaca, NY (US); Gregory Galyanov, Ithaca, NY (US); Cornelis J. Drost, Ithaca, NY (US)

(73) Assignee: Transonic Systems Inc., Ithaca, NY (US)

( * ) Notice: Subject to any disclaimer, the term of this patent is extended or adjusted under 35 U.S.C. 154(b) by 489 days.

(21) Appl. No.: 17/713,940

(22) Filed: Apr. 5, 2022

(65) Prior Publication Data
US 2023/0036473 A1  Feb. 2, 2023

Related U.S. Application Data

(63) Continuation-in-part of application No. 17/387,391, filed on Jul. 28, 2021.

(51) Int. Cl.
*A61M 1/36* (2006.01)

(52) U.S. Cl.
CPC ........ *A61M 1/3656* (2014.02); *A61M 1/3639* (2013.01); *A61M 2205/15* (2013.01); *A61M 2205/18* (2013.01); *A61M 2205/3331* (2013.01)

(58) Field of Classification Search
CPC .............. A61M 1/3656; A61M 1/3639; A61M 2205/15; A61M 2205/18;
(Continued)

(56) References Cited

U.S. PATENT DOCUMENTS

| | | |
|---|---|---|
| 5,928,180 A | 7/1999 | Krivitski et al. |
| 7,004,924 B1 | 2/2006 | Brugger et al. |

(Continued)

FOREIGN PATENT DOCUMENTS

| | | |
|---|---|---|
| CN | 101505812 A | 8/2009 |
| WO | 2008021462 A2 | 2/2008 |

(Continued)

OTHER PUBLICATIONS

Korean Intellectual Property Office (ISA/KR), International Search Report issued in corresponding International Application No. PCT/US/2022/038495, dated Nov. 14, 2022.

(Continued)

*Primary Examiner* — Kai H Weng
(74) *Attorney, Agent, or Firm* — Jodi A. Reynolds, Esq.; Harter Secrest & Emery, LLP

(57) ABSTRACT

A system and method for identifying a disruption of a flow from an extracorporeal circuit to a patient circulatory system, such as a venous needle dislodgement or an access-bloodline separation, is based on flow rate data of the extracorporeal circuit. A patient contribution to the flow rate data can be identified as a harmonic and monitored to assess the presence of the disruption. The system can identify an inharmonic change, such as a spike, in the flow rate in the extracorporeal circuit, wherein the inharmonic change can be used alone or in conjunction with the identified harmonic to assess the existence of the disruption. The system can employ the spike in a blood flow rate as well as a spike in a dialysate flow rate fluidly connected to the extracorporeal circuit, wherein the spike can be used to identify the disruption.

19 Claims, 10 Drawing Sheets

(58) Field of Classification Search
CPC ........ A61M 2205/3331; A61M 1/3403; A61M 1/342; A61M 1/16; A61M 1/3609; A61M 2205/3317; A61M 5/16854; A61M 1/3641; A61M 1/38; A61M 1/3663; A61M 1/3655; A61M 1/3658; A61M 1/367; A61M 1/3653; G16H 20/40; A61B 5/0275

See application file for complete search history.

(56) References Cited

U.S. PATENT DOCUMENTS

| | | |
|---|---|---|
| 8,926,544 B2 | 1/2015 | Hogard |
| 9,011,334 B2 | 4/2015 | Bouton |
| 10,183,107 B2 | 1/2019 | Utsugida |
| 10,537,673 B2 | 1/2020 | Gerber et al. |
| 10,646,636 B2 | 5/2020 | Du et al. |
| 10,688,237 B2 | 6/2020 | Wolff et al. |
| 10,744,253 B2 | 8/2020 | Gerber et al. |
| 10,973,973 B2 | 4/2021 | Peters et al. |
| 11,000,640 B2 | 5/2021 | Lazar |
| 2001/0050256 A1 | 12/2001 | Krivitski |
| 2002/0198483 A1 | 12/2002 | Wariar et al. |
| 2010/0022934 A1 | 1/2010 | Hogard |
| 2012/0059305 A1 | 3/2012 | Akingba |
| 2013/0292319 A1 | 11/2013 | Fulkerson et al. |
| 2013/0303961 A1 | 11/2013 | Wolff et al. |
| 2014/0298891 A1 | 10/2014 | Holmer et al. |
| 2015/0246173 A1 | 9/2015 | Steger |
| 2015/0374896 A1 | 12/2015 | Du et al. |
| 2016/0270733 A1 | 9/2016 | Hansson et al. |
| 2017/0021087 A1 | 1/2017 | Prosl et al. |
| 2018/0289550 A1 | 10/2018 | Ye et al. |
| 2019/0217002 A1 | 7/2019 | Urakabe |
| 2019/0240392 A1 | 8/2019 | Sternby |
| 2019/0255244 A1 | 8/2019 | Lazar |
| 2019/0381233 A1 | 12/2019 | Frinak et al. |
| 2021/0154386 A1 | 5/2021 | Nürnberger et al. |

FOREIGN PATENT DOCUMENTS

| | | |
|---|---|---|
| WO | 2009038834 A1 | 3/2009 |
| WO | 2009042262 A1 | 4/2009 |
| WO | 2016071713 A1 | 5/2016 |
| WO | 2018048995 A1 | 3/2018 |

OTHER PUBLICATIONS

Korean Intellectual Property Office (ISA/KR), International Search Report issued in corresponding International Application No. PCT/US/2022/038514, dated Nov. 16, 2022.

METHOD AND APPARATUS FOR IDENTIFYING DISRUPTION OF A FLUID CONNECTION BETWEEN AN EXTRACORPOREAL CIRCUIT AND A PATIENT CIRCULATORY SYSTEM

CROSS-REFERENCE TO RELATED APPLICATIONS

The present application is a continuation in part of U.S. application Ser. No. 17/387,391 filed Jul. 28, 2021, entitled METHOD AND APPARATUS FOR IDENTIFYING DISRUPTION OF A FLUID CONNECTION BETWEEN AN EXTRACORPOREAL CIRCUIT AND A PATIENT CIRCULATORY SYSTEM, the entirety of which is hereby incorporated by reference.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

REFERENCE TO A SEQUENCE LISTING

Not applicable.

STATEMENT REGARDING PRIOR DISCLOSURES BY THE INVENTOR OR A JOINT INVENTOR

Not applicable.

BACKGROUND OF THE INVENTION

Field of the Invention

The present disclosure relates to an apparatus and a method for detecting a disruption of a fluid connection between an extracorporeal circuit and a patient circulatory system, and particularly to an apparatus and method for detecting a disruption downstream of a blood pump in a blood treatment apparatus in an extracorporeal circuit, including but not limited to a venous needle dislodgement (VND) or access-bloodline separation (ABLS), and more particularly to an apparatus and method for identifying a disconnect of a venous line of an extracorporeal circuit and a patient circulatory system, wherein the disconnect corresponds to a change in a patient contribution to flow rate data in the extracorporeal circuit, and particularly the venous line.

Description of Related Art

A variety of different medical treatments relate to the delivery of fluid to, through and/or from a patient, such as the delivery of blood between a patient and an extracorporeal system connected to the patient via a needle, or needles, or catheters inserted into the patient. For example, hemodialysis, hemofiltration and hemodiafiltration are all treatments that remove waste, toxins and excess water from the blood. During these treatments, the patient is connected to an extracorporeal circuit and machine, and the blood is pumped through the circuit and the machine. Waste, toxins and fluid are removed from the blood, and the cleaned blood is returned to the patient.

In these treatments, needles or catheters or similar access devices are inserted into the vascular system of the patient so that the blood can be transported to and from the extracorporeal machine. Traditional hemodialysis, hemofiltration and hemodiafiltration treatments can last several hours or days or even weeks and are generally performed in a treatment center. For in-center treatments, patients undergoing hemodialysis, for example, are monitored visually to detect needle dislodgment. However, the needle may not be in plain view of the patient or medical staff (e.g., it may be covered by a blanket) such that it could delay detection of any disruption and an appropriate timely response.

Moreover, in view of the increased quality of life, observed reductions in both morbidity and mortality and lower costs with respect to in-center treatments, a renewed interest has arisen for self-care and home therapies, such as home hemodialysis. Such home therapies (whether hemodialysis, hemofiltration or hemodiafiltration) can be performed during the day, evening or nocturnally. If unsupervised or asleep, dislodgment risks increase because a caregiver is not present and perhaps even the patient is not aware of a dislodgment.

However, dialysis is a complicated procedure that is historically carried out by a team of trained professionals who are responsible for delivering safe and effective care to the patient. Recently, the dialysis can also be self-administered by a patient in their home. However, there are still many ways that complications can arise during a dialysis session. While many of these potential issues are constrained by alarm circuits and other safeguards built into the dialysis machine, needle dislodgement (including displacement) can sometimes remain undetected or only detected after a significant time delay.

In extracorporeal blood processing, it is important to minimize the risk for malfunctions in the extracorporeal circuit, since these may lead to a potentially life-threatening condition of the patient. Serious conditions may arise if the extracorporeal circuit is disrupted downstream of the blood pump, e.g. by a venous needle dislodgement (VND), in which the venous needle comes loose from the patient or from the patient access, or an access-bloodline separation (ABLS) in which the central venous catheter (CVC) or fistula becomes disconnected from the hemodialysis bloodline used for treatment. Such a disruption may cause the patient to be drained of blood within minutes.

Specifically, the connection of the extracorporeal circuit to the venous access may become disturbed, if, for example, the needle or cannula gets out of place and the extracorporeal circulation is no longer connected properly, or is no longer connected at all, to the patient. This may cause problems especially in the case of dislodgement of the venous access to the vascular system of the patient. Unless such dislodgement of the venous access is detected in due time, blood continues being withdrawn from the patient via the arterial access but is no longer properly returned into the patient after the extracorporeal blood treatment. In the case of common blood flow rates of 300 to 400 ml/min, for example, a critical situation will develop within a few minutes.

Conventionally, VND may be detected during blood processing based on a pressure signal from a pressure sensor ("venous pressure sensor") on the downstream side of the blood pump in the extracorporeal circuit. However, it may be difficult to set appropriate threshold values, since the pressure in the extracorporeal circuit may vary between treatments, and also during a treatment, such as for example as a result of the subject moving. Further, if the extracorporeal circuit comes loose and gets stuck in bed sheets or the subject's clothes, the measured pressure level might not change enough to indicate the potentially dangerous situation.

Therefore, the need exists for improved systems and methods for detecting a disruption of a fluid connection between an extracorporeal circuit and a patient circulatory system and particularly for detecting a disruption downstream of a blood pump in a blood treatment apparatus in an extracorporeal circuit, including but not limited to an access-bloodline separation (ABLS), or a venous needle dislodgement (VND), or connection to the catheter dislodgement.

BRIEF SUMMARY OF THE INVENTION

Generally, the present disclosure provides an apparatus for monitoring an extracorporeal circuit extending from a patient blood withdrawal site through an extracorporeal blood treatment device and back to a patient blood delivery site, wherein the extracorporeal circuit comprises a blood withdrawal line extending from the patient blood withdrawal site to the blood treatment device, a blood delivery line extending from the blood treatment device to the patient blood delivery site, and a pump operable to pump blood through the extracorporeal circuit from the blood withdrawal line, through the blood treatment device and through the blood delivery line to the patient blood delivery site, the apparatus including a flow sensor configured to obtain flow rate data of a blood flow in at least one of the blood withdrawal line and the blood delivery line; and a controller in communication with the flow sensor, wherein the controller is configured to identify, in the flow rate data, a patient contribution to the flow rate data from a patient physiological process; and detect, based at least partly on the identified patient contribution, a disruption of the extracorporeal circuit.

In one configuration, the present disclosure provides a monitor for monitoring an extracorporeal blood circuit extending from a vascular access through an extracorporeal blood treatment device and back to the vascular access, wherein the extracorporeal blood circuit comprises an arterial line as a blood withdrawal line extending from a vascular access to the blood treatment device, a venous line as a blood delivery line extending from the blood treatment device to the vascular access, and a pump operable to pump blood through the extracorporeal blood circuit from the arterial line, through the blood treatment device and through the venous line to the vascular access, the monitor including a flow sensor for obtaining flow rate data of a blood flow in the venous line; and a controller in communication with the flow sensor, the controller configured to (i) identify, in the obtained flow rate data, a patient contribution to the flow rate data from a downstream patient physiological process; and (ii) detect, based at least partly on the identified patient contribution, a disruption of flow between the extracorporeal blood circuit and the patient. It is further disclosed that the controller can (i) determine, based on the obtained flow rate data, a flow rate in the venous line; (ii) identify, in the determined flow rate, a patient contribution to the flow rate from a downstream patient physiological process; and (iii) detect, based at least partly on the identified patient contribution, the disruption of flow between the extracorporeal blood circuit and the patient.

The present disclosure also contemplates the disruption can be identified from obtaining flow rate data from the arterial (blood withdrawal) line as well as or in place of flow rate data from the venous (blood delivery) line. In addition, the disruption can be identified by comparing or correlating the flow rate data from the venous line and the arterial line, as well as changes in such comparison or correlation of the flow rate data.

The present disclosure further contemplates a controller connected to a flow sensor sensing flow rate data through a venous (blood delivery) line of an extracorporeal circuit, the controller configured to identify a disruption in a blood flow downstream of the flow sensor corresponding to a change in, or disappearance of, a patient contribution to flow rate data in the venous line.

A method is disclosed including identifying a disruption of a connection of a venous (blood delivery) line of an extracorporeal circuit and a patient circulatory system, wherein the disruption corresponds to a change in, or disappearance of, a patient contribution to flow rate data in the venous line.

A further method includes identifying a patient contribution from a downstream patient physiological function of measured flow rate data in a venous (blood delivery) line of an extracorporeal circuit; and monitoring the patient contribution to identify a disruption of a vascular access.

An additional method is provided of measuring flow rate data in a venous (blood delivery) line of an extracorporeal circuit having a pump imparting a flow in the venous line; and identifying a disruption of the venous line and a circulatory system corresponding to a change of a component of the measured flow rate data, which component corresponds to a physiological parameter of a downstream circulatory system connected to the venous line.

The present disclosure also includes a method for monitoring an extracorporeal blood treatment apparatus that comprises an extracorporeal blood circuit, the extracorporeal blood circuit having an arterial blood line with an arterial patient connection and a venous blood line with a venous patient connection, and a pump for conveying blood in the extracorporeal blood circuit, the method including measuring blood flow rate data in the venous blood line of the extracorporeal blood circuit; identifying a patient contribution of the measured blood flow rate data corresponding to a downstream physiological parameter of the patient; determining a presence of a disruption of flow between the extracorporeal circuit and the patient circulatory system in response to a change in, or disappearance of, the patient contribution to the measured blood flow rate data; and generating a control signal to activate an alarm unit, stop the pump, or both, after the step of determining the presence of the disruption.

In a further configuration, the present disclosure provides an apparatus for monitoring an extracorporeal circuit extending from a patient circulatory system through a patient blood withdrawal site to an extracorporeal blood treatment device and returning to the patient circulatory system through a patient blood delivery site, wherein the extracorporeal circuit comprises a blood withdrawal line extending from the patient blood withdrawal site to the blood treatment device, a blood delivery line extending from the blood treatment device to the patient blood delivery site, and a pump configured to pump blood through at least a portion of the extracorporeal circuit, the apparatus including a flow sensor configured to obtain flow rate data of a blood flow in a portion of the extracorporeal circuit; and a controller in communication with the flow sensor, the controller configured to detect, based at least partly on an inharmonic increase in a blood flow rate in the at least one of the blood withdrawal line and the blood delivery line, a disruption between the extracorporeal circuit and the patient circulatory system.

The present disclosure also includes a controller connected to a flow sensor providing flow rate data of a blood flow through a blood delivery line of an extracorporeal circuit, the controller configured to identify a disruption in a blood flow from the extracorporeal circuit to a patient circulatory system corresponding to an inharmonic change in a blood flow rate in the provided flow rate data.

An additional method is provided including the step of identifying a disruption of a connection of a blood delivery line of an extracorporeal circuit and a patient circulatory system, wherein the disruption corresponds to an inharmonic increase in a flow rate in the extracorporeal circuit.

The following will describe embodiments of the present disclosure, but it should be appreciated that the present disclosure is not limited to the described embodiments and various modifications of the invention are possible without departing from the basic principles. The scope of the present disclosure is therefore to be determined solely by the appended claims.

BRIEF DESCRIPTION OF THE SEVERAL VIEWS OF THE DRAWING(S)

DETAILED DESCRIPTION OF THE INVENTION

Figure 1:
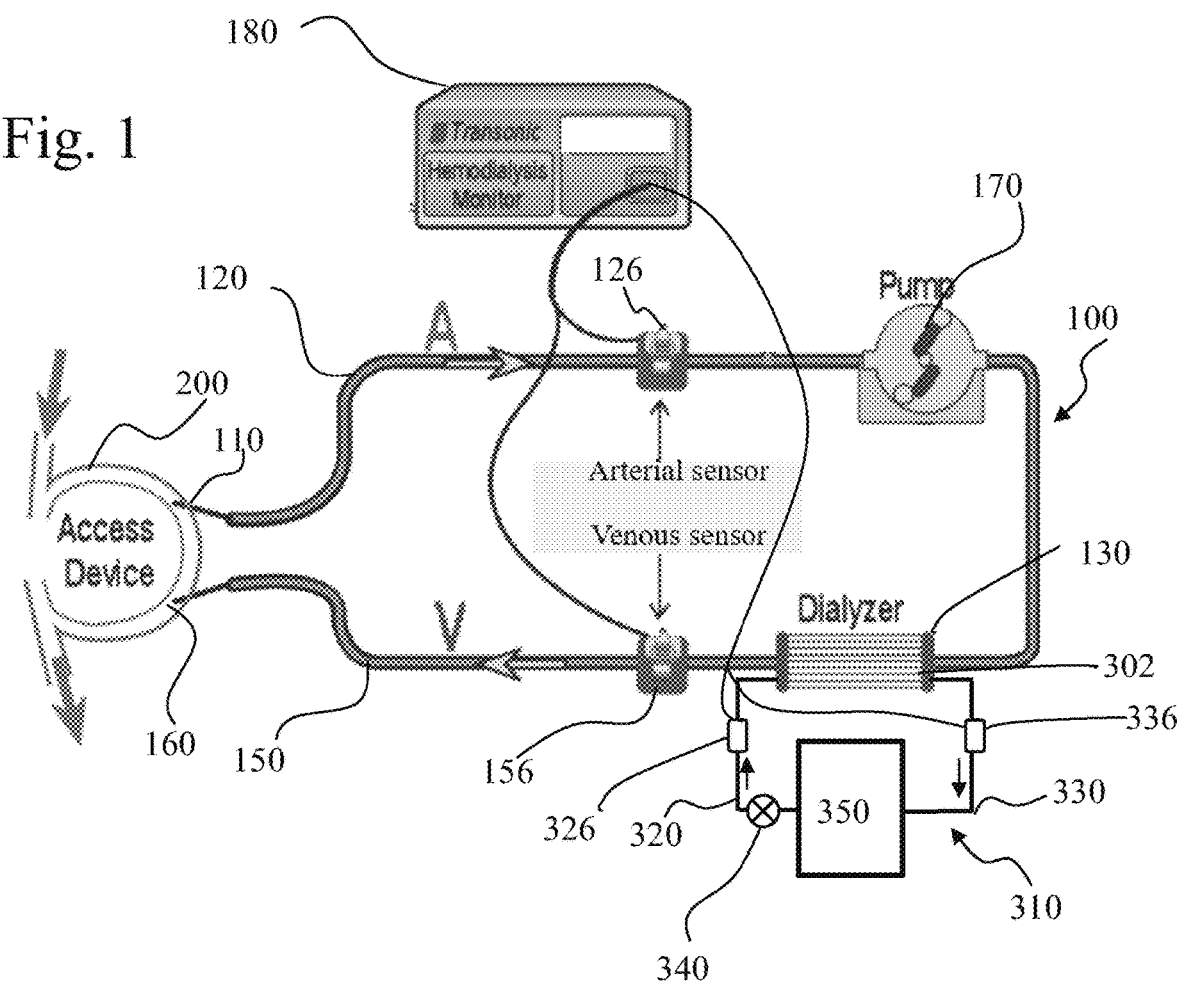
FIG. 1 is a schematic of a representative extracorporeal circuit and access device for connection to a patient circulatory system.
Figure 12:
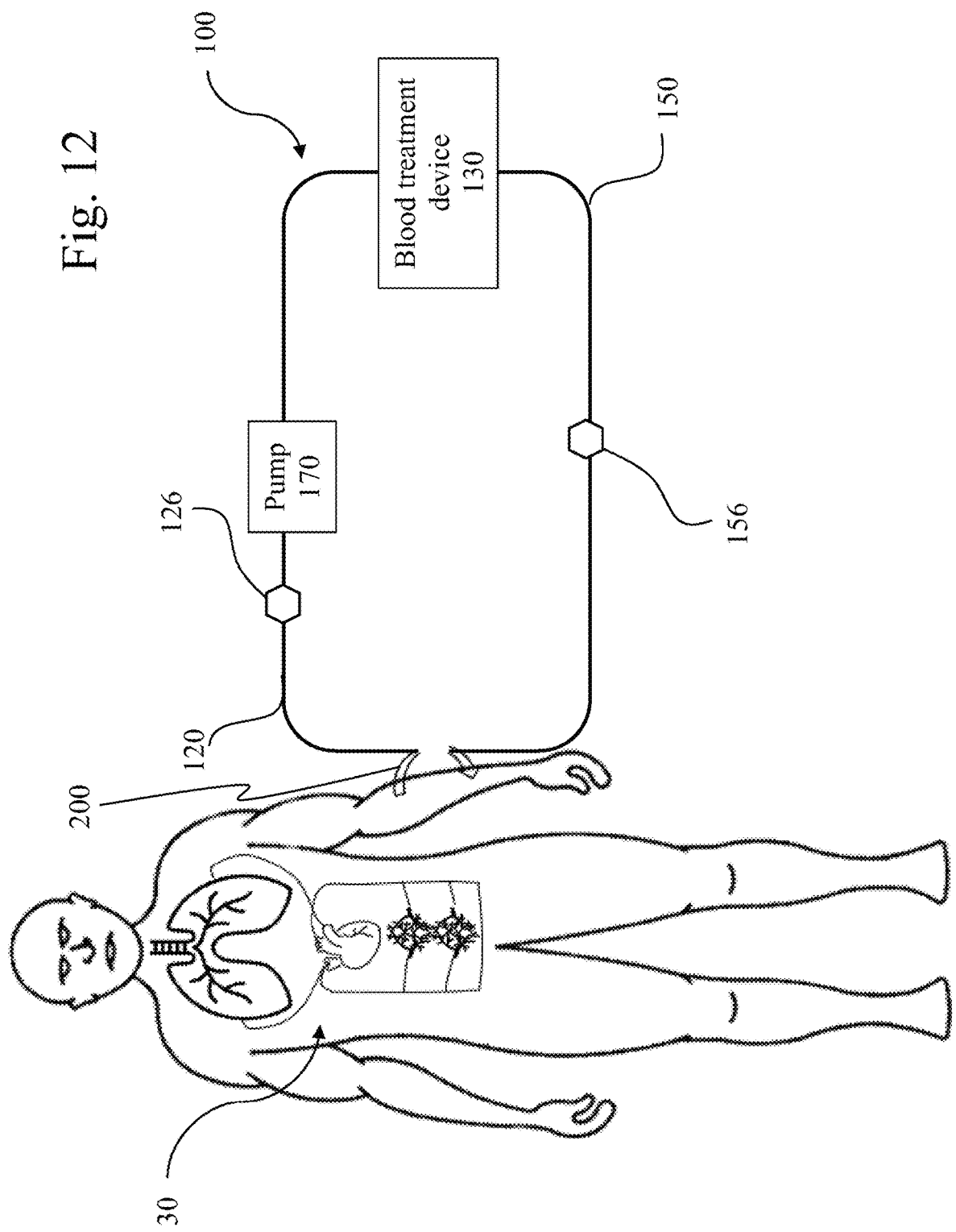
FIG. 12 is a schematic representation of the extracorporeal circuit and the patient circulatory system.

Referring to FIGS. 1 and 12, an extracorporeal circuit ("EC circuit") 100 is shown connected to a patient circulatory system 30.

The extracorporeal circuit 100 extends from a patient blood withdrawal site 110 which can be a portion of or connected to the patient circulatory system 30, through a blood treatment device 130 and back to a patient blood delivery site 160 which can be a portion of or connected to the patient circulatory system, wherein the extracorporeal circuit comprises a blood withdrawal line 120 extending from the patient blood withdrawal site to the blood treatment device, a blood delivery line 150 extending from the blood treatment device to the patient blood delivery site, and a pump 170 configured to pump blood through the extracorporeal circuit from the blood withdrawal line, through the blood treatment device and through the blood delivery line to the patient blood delivery site. A flow sensor is configured to obtain blood flow rate data from at least one of the blood withdrawal line 120 and the blood delivery line 150. In certain configurations, a flow sensor 126 obtains flow rate data from the blood withdrawal line 120 and a flow sensor 156 obtains flow rate data from the blood delivery line 150. A controller 180 is connected to at least one of the flow sensors 126, 156, and the pump 170.

In one configuration, the extracorporeal circuit 100 is configured to provide dialysis wherein the blood withdrawal line 120 is referred to as an arterial line, the blood treatment device 130 includes, but not limited to a dialyzer, and the blood delivery line 150 is referred to as a venous line. For purposes of description, the blood travels from an access device 200 to the arterial line 120 and returns to the access device in the venous line 150. Although, the extracorporeal circuit 100 is shown with both the arterial flow sensor 126 and the venous flow sensor 156, it is understood that the disclosed system may be practiced without or with the use of the arterial flow sensor.

In one configuration, the extracorporeal circuit 100 is fluidly connected to a dialysate side 302 of the blood treatment device 130, such as the dialyzer shown in FIG. 1. In FIG. 1, a dialysate circuit 310 as known in the art includes a dialysate inlet line 320 to the dialyzer, a dialysate outlet line 330 from the dialyzer, a pump 340, and the associated control, makeup, and balancing mechanisms shown schematically at 350. In addition, the dialysate circuit 310 can include a dialysate inlet flow sensor 326 configured to sense a flow in the dialysate inlet line 320 and a dialysate outlet flow sensor 336 configured to sense a flow in the dialysate outlet line 330, wherein the dialysate inlet and outlet flow sensors can be as the flow sensors 126, 156 set forth below.

For purposes of description in terms of dialysis nomenclature, the blood travels from the patient blood withdrawal site 110 to the arterial line 120 (the blood withdrawal line) and returns to the patient blood delivery site 160 through the venous line 150 (the blood delivery line). In this nomenclature, the flow sensor 126 obtaining flow rate data in the arterial line is referred to the arterial flow sensor 126 and the flow sensor 156 obtaining flow rate data in the venous line is referred to as the venous flow sensor 156.

While the system is shown with both the arterial flow sensor 126 and the venous flow sensor 156, it is understood that the present disclosure can be practiced with just the arterial flow sensor 126, just the venous flow sensor 156, or both the arterial flow sensor and the venous flow sensor.

As set forth above, in one configuration, the extracorporeal circuit 100 is configured to provide extracorporeal blood treatment. In extracorporeal blood treatment, blood is taken out of a patient, processed (e.g. treated) and then reintroduced into the patient by means of the extracorporeal circuit 100 which can be part of the blood treatment device 130. Thus, in one configuration, the extracorporeal circuit includes both the dialysate circuit 310 and the blood side including the arterial line 120 and the venous line 150, along with the blood treatment device 130.

Extracorporeal blood treatment includes hemodialysis, hemodiafiltration, hemofiltration, plasmapheresis, etc., including the clearance of toxins from the blood, such as by diffusion across a membrane.

For purposes of the present description, the following terminology is used. The term "flow rate data" is any data from which a flow rate can be derived, assessed, or calculated, as well as any surrogate data for deriving, assessing, or calculating the flow rate. It is further contemplated that the flow rate can be the actual blood flow rate, the calculated blood flow rate, or a predicted flow rate, as well as any surrogate of the actual blood flow rate, such as but not limited to a flow velocity, or a value proportional or related to the blood flow or the velocity. The flow rate data encompasses any signals or data related to the blood flow, and particularly related to any pulsatile, varying, frequency dependent, or oscillatory component or characteristic of the flow, such as indicated by any signals, such as but not limited to optical signals, acoustic signals, electromagnetic signals, temperature signals and other signal that can be source of frequency analysis. Thus, the flow rate data includes any signals or data representing the flow rate or signals or data from which the flow rate, or any pulsation, variation, frequency variation, or oscillation of the flow rate, or pulsation, variation, frequency variation, or oscillation in the flow rate can be determined, or sensed, or any corresponding surrogates. For example, markers in the blood, including native or introduced particles could be used as the surrogate. Thus, the term flow rate is intended to encompass any value or measurement that corresponds to, is a surrogate of, or can represent the respective blood flow or the dialysate flow and especially to any pulsation, variation, frequency variation, oscillation, or a characteristic or property of the flow. The term "flow rate" (which encompasses "blood flow rate" and "dialysate flow rate") thus encompasses the volumetric flow rate as a measure of a volume of liquid passing a cross-sectional area of a conduit per unit time, and may be expressed in units of volume per unit time, typically milliliters per min (ml/min) or liters per minute (1/min), and any of its surrogates. It is understood the flow rate, such as the blood flow rate and the dialysate flow rate, can be measured as well as calculated by any of a variety of known systems and methods for flow sensors 126, 156, 326, and 336.

The access device 200 fluidly connects to the patient circulatory system 30 such as a human (or animal) circulatory system which includes blood, a vascular system having a cardiopulmonary system and a systemic system connecting the cardiopulmonary system to the tissues of the body, and a heart. Specifically, the systemic system passes the blood though the vascular system (arteries, veins, and capillaries) throughout a patient body. Thus, the access device 200 fluidly connects to the patient circulatory system 30 and provides access to the extracorporeal circuit 100. The term "access device' encompasses any access to the circulatory system 30 of the patient and includes but not limited to catheters, needles, shunts, AV native fistulae, AV-artificial graft; as well as a venous catheter, or other vascular implantations. The connection of the extracorporeal circuit 100 to the patient, via the access device 200, usually includes catheters or cannulas or needles, e.g. dialysis cannulas, where the access device 200, for example, is punctured and fluid communication is established. As set forth herein, the access device 200 encompasses the patient blood withdrawal site 110 as well as the patient blood delivery site 160. Thus, the access device 200 includes separate arterial access and venous access as well as arterial access and venous access that are proximal or adjacent, or within a common shunt, line, or graft.

The term "blood treatment" means any blood processing including but not limited to dialysis, which in turn includes toxin clearance such as by diffusive therapy including but not limited to hemofiltration, hemodialysis, hemodiafiltration, or Continuous Renal Replacement Therapy (CRRT) A blood treatment device is any device for imparting the blood treatment. Thus, in one configuration, the blood treatment device, such as the dialyzer, can be configured to provide controllable transfer of solutes and water across a semi permeable membrane separating flowing blood and dialysate streams. Such a transfer process may include diffusion (dialysis) and convection (ultra-filtration). The blood treatment device may provide any of a host of other blood treatments, such as chemical treatment, electromagnetic treatment as well as thermal treatment.

The term blood includes treated or untreated blood, including artificial or natural blood, as well as plasma.

The term "disruption" encompasses any diversion, disconnection, dislodgement, or interruption of the flow between the extracorporeal circuit 100 and the patient circulatory system 30. A disruption may occur downstream of the pump 170, downstream of the blood treatment device 130, as well as between the extracorporeal circuit 100 and the access device 200 or between the access device and the patient circulatory system 30, including the patient blood withdrawal site 110 as well as the patient blood delivery site 160, such as a venous needle dislodgement, or disconnect. The term "disruption" thus includes, but is not limited to a venous needle dislodgement (VND), in which the venous needle comes loose from the patient or from the patient access, or an access-bloodline separation (ABLS) in which the central venous catheter (CVC) or fistula becomes disconnected from the hemodialysis bloodline used for treatment.

The term "controller" includes signal processors and computers, including programmed desk or laptop computers, or dedicated computers for processors. Such controllers can be readily programmed to perform the recited calculations, or derivations thereof, to provide determinations of the flow rate and transforms of the flow rate data as set forth herein. The controller can also perform preliminary signal conditioning such as summing one signal with another signal or portion of another signal.

The term "flow sensor" encompasses any sensing device that provides a signal representing the flow rate data or data from which the flow rate, any pulsation, variation, frequency change, or oscillation in the flow rate, or surrogate of the flow rate, pulsation, variation, frequency change, or oscillation in the flow rate can be determined, or sensed.

The term "upstream" of a given position refers to a direction against the flow of blood, and the term "downstream" of a given position is the direction of blood flow away from the given position. The "arterial line" or side is that part of the extracorporeal circuit 100 which blood passes from the patient blood withdrawal site 110, such as the access device 200 to flow to the blood treatment device 130. The "venous line" or side is that part of the extracorporeal circuit 100 which blood passes from the blood treatment device 130 to the patient blood delivery site 160, such as the access device 200.

Generally, the blood is circulated through the extracorporeal circuit 100 by the pump 170. It is understood, the present disclosure encompasses the extracorporeal circuit 100, wherein the blood treatment device 130 (such as an extracorporeal membrane oxygenator, ECMO) withdraws blood from the venous portion of the patient circulatory system 30, and returns treated (oxygenated) blood to a second venous portion of the patient circulatory system as well as configurations wherein the blood is removed from either the venous portion or the arterial portion of the patient circulatory system and is returned to either the venous portion or the arterial portion of the patient circulatory system, wherein the detected disruption can be in any of these configurations.

It is also contemplated that the present disclosure encompasses the extracorporeal circuit 100 having a plurality of patient blood withdrawal sites 110, a plurality of blood withdrawal lines 120, a plurality of blood treatment devices 130, a plurality of pumps 170, a plurality of blood delivery lines 150 and a plurality of patient blood delivery sites 160, or any combination thereof. Thus, the present system can have more than one blood delivery line 150 to the patient. It is understood that in certain types of extracorporeal blood treatment, the extracorporeal circuit 100 includes the arterial needle for blood withdrawal and the venous needle for blood reintroduction, wherein the needles are inserted into the access device 200. Thus, in select configurations, the extracorporeal circuit 100 withdraws blood from the access device 200 and returns the blood to the access device. The withdrawn blood can be treated while it is withdrawn, such as through the dialyzer 130 before being returned through the venous line 150 to the access device 200.

In one configuration, the blood passes from the access device 200, through the pump 170, then through the blood treatment device 130, such as the dialyzer. The blood then passes from the blood treatment device 130 to the access device 200. Although not shown, it is contemplated the venous line 150 can include an air trap and air detector between the blood treatment device 130 and the access device 200.

Depending upon the configuration of the extracorporeal circuit 100 and the mechanisms for measuring the blood parameters, the arterial line 120 can also include or provide an introduction port as a site for introducing a material into the extracorporeal circuit 100.

The venous line 150 connects the flow of the extracorporeal circuit 100 to the circulatory system 30, such as through the access device 200. The venous line 150 typically includes a return (venous) cannula providing the fluid connection to the access device 200.

The venous line 150 includes the flow sensor 156. The flow sensor 156 measures a flow characteristic or parameter to generate flow rate data, from which the flow rate, or any flow pulsation, variation, frequency change, or oscillation component, or flow frequency components can be determined. Thus, the flow sensor 156 can include a flow rate sensor, an ultrasound sensor or even a dilution sensor for sensing passage of the indicator through the extracorporeal circuit 100. The flow sensor 156 can be any of a variety of sensors which obtain flow rate data. In select configurations, the flow sensor 156 (as well as sensor 126) can measure different blood properties: such as but not limited to temperature, Doppler frequency, electrical impedance, optical properties, density, ultrasound velocity, concentration of glucose, oxygen saturation and other blood substances (any physical, electrical or chemical blood properties). Alternatively, there can be an additional sensor (not shown) in addition to flow sensor 156 be to measure select blood characteristics or properties.

The flow sensor 126 in the arterial line 120 can be any of a variety of sensors, as set forth in the description of the flow sensor 156. While the system is described with the two flow sensors 126, 156, for an enhanced accuracy, it is understood only a single flow sensor is necessary. It is further contemplated that any imparted flow pulsation from the pump 170 can be identified such as through an operating parameter of the pump, including the revolutions per minute of operation of the pump, wherein this contribution is distinguished from any patient contribution Specifically, in the arterial line 120, the flow sensor 126, if employed, can be any of a variety of sensors to obtain the flow rate data. The flow sensor 126 can measure different blood properties: such as but not limited to temperature, Doppler frequency, electrical impedance, optical properties, density, ultrasound velocity, concentration of glucose, oxygen saturation and other blood substances (any physical, electrical or chemical blood properties) that are related to, correspond to or evidence the blood flow rate and pulsation, oscillation, variation or frequency change within, or time variation of the flow rate. It is also understood the flow sensor 126 can also measure the blood flow rate. Thus, in one configuration the present system includes a single blood property sensor and a single flow rate sensor. It is further contemplated that a single combined sensor for measuring flow rate and a blood parameter (property) can be used.

It is also understood the flow sensors 126, 156 can be located outside of the extracorporeal circuit 100. That is, the flow sensors 126, 156 can be remotely located and measure in the extracorporeal circuit 100, the changes produced in the blood from the indicator introduction or values related to the indicator introduction which can be transmitted or transferred by means of diffusion, electro-magnetic or thermal fields or by other means to the respective sensor. It is contemplated the flow sensors 326 and 336 can be any of the described implementations for flow sensors 126 or 156.

The pump 170 can be any of a variety of pumps types, including but not limited to a peristaltic, a roller, an impeller, or a centrifugal pump. The pump 170 induces a blood flow rate through the extracorporeal circuit 100. Depending on the specific configuration, the pump 170 can be directly controlled at the pump or can be controlled through the controller 180 to establish a given blood flow rate in the extracorporeal circuit 100. The pump 170 can be at any of a variety of locations in the extracorporeal circuit 100, and is not limited to the position shown in FIG. 1. In one configuration, the pump 170 is a commercially available pump and can be set or adjusted to provide any of a variety of flow rates wherein the flow rate can be read by a user and/or transmitted to and read by the controller 180.

The normal or forward blood flow through the extracorporeal circuit 100 includes withdrawing blood through the arterial line 120 from the access device 200, passing the withdrawn blood through the extracorporeal circuit (to treat the blood in the dialyzer 130), and introducing the withdrawn (or treated) blood through the venous line 150 into the access device. The pump 170 can induce a blood flow through the extracorporeal circuit 100 from the access device 200 and back to the access device.

The controller 180 is typically connectable to the blood treatment device 130, the pump 170 and the flow sensor 156 and the flow sensor 126, if employed. The controller 180 can be a stand-alone device such as a personal computer, a dedicated device or embedded in one of the components, such as the pump 170 or the blood treatment device 130. Although the controller 160 is shown as connected to the flow sensors 126 and 156, the pump 170 and the blood treatment device 120, it is understood the controller can be connected to only the flow sensors, the sensors and the pump, or any combination of the flow sensors, pump and blood treatment device 130.

It has been discovered that the flow rate data from the venous line, including the flow rate in the venous line 150 is generally pulsatile with a frequency from the pump 170 as well as incorporating a component in response to physiology of the patient downstream of the measured flow rate data in the venous line. That is, there is a patient contribution to the flow rate data, and hence the flow rate, in the venous line 150, wherein at least a portion of the patient contribution to the obtained flow rate data corresponds to downstream physiological effects within the patient. Such portion of the patient contribution may include components from the pulse of the patient in the circulatory system 30, as well as a respiration component. As the flow through the extracorporeal circuit 100 is imparted by the pump 170 and the patient physiology is downstream of the venous line 150, it is a surprising discovery that there is a patient contribution to the flow rate in the venous line. As set forth below, it has been further discovered that the flow rate data from the arterial line 120 includes a patient contribution, wherein at least a portion of the patient contribution to the obtained flow rate data corresponds to physiological effects within the patient.

The patient contribution to the flow rate data is generated by the patient physiology, and propagates through the access device 200, such as through needles in case of an AV shunt or from the central veins (or the heart) in case of the access device being a catheter interfacing with the circulatory system 30. It has been found that the patient contribution can be observed in the flow rate data, such as the blood flow rate, in the extracorporeal circuit 100, and particularly in the pulsatile flow of both the arterial line 120 and the venous line 150. It is noted that the patient contribution observed in the arterial line 120 is traversing predominantly from the arterial access of the extracorporeal circuit 100 and the flow rate data can be obtained in the arterial line. It is noted that any patient contribution propagating upstream from the venous line 150 to the arterial line 120 must pass through the pump 170, the blood treatment device 130, such as the dialyzer and any bubble traps, each of which will substantially dampen the appearance of the patient contribution traversing from the venous access. That is, the patient contribution propagating upstream along the venous line 150 is substantially dampened as the contribution passes the pump 170, the blood treatment device 130 and any bubble traps and into the arterial line 120. Thus, of the flow rate data taken from the arterial line 120 the patient contribution is predominately that which has traversed downstream from the patient through the arterial line 120. Similarly, the patient contribution observed in the venous line 150 is predominantly the patient contribution that has propagated upstream along the venous line 150 from the access device 200. Any patient contribution propagating downstream along the arterial line 120 is substantially dampened as such contribution passes through the pump 170, the blood treatment device 130 and the any bubble traps and into the venous line 150. That is, in the flow rate data from the venous line 150, the patient contribution is dominated by the patient contribution that has propagated upstream along the venous line from the access device 200, (such as the needle or the venous catheter lumen)—as the pump 170, the blood treatment device 130 (the dialyzer), and any bubble traps substantially dampen any patient contribution propagating downstream from the arterial line 120 to the venous line 150. In the case of an arterial access disruption or disconnect, the pump 170 will suck air and hence blood flow through the extracorporeal circuit 100 will stop. However, in the case of a disruption or disconnect of the venous line 150, the flow in the arterial line 120 and hence the patient contribution in the arterial line may remain sufficiently unchanged to provide a reliable indicator of a disruption of the venous line.

The controller 180 is programmed to identify the patient contribution to the flow rate data, such as in the blood flow rate in the venous line 150 and compare the patient contribution to the flow rate data across two different times, or identify a change in the patient contribution, such as a change of a predetermined level, or a lack of patient contribution in the flow rate data, or the measured flow rate.

Figure 2:
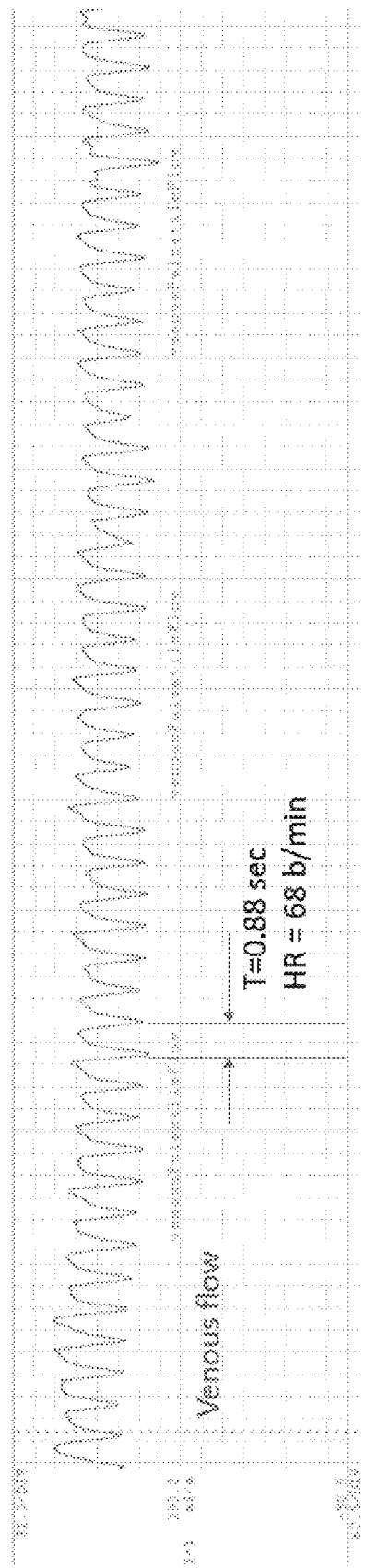
FIG. 2 is a graph of flow rate versus time in a venous line in the extracorporeal circuit.

As seen in FIG. 2, the venous flow pulsates with frequency of approximately 68 beats/minute, which pulsation is related to a patient heart rate.

Figure 3:
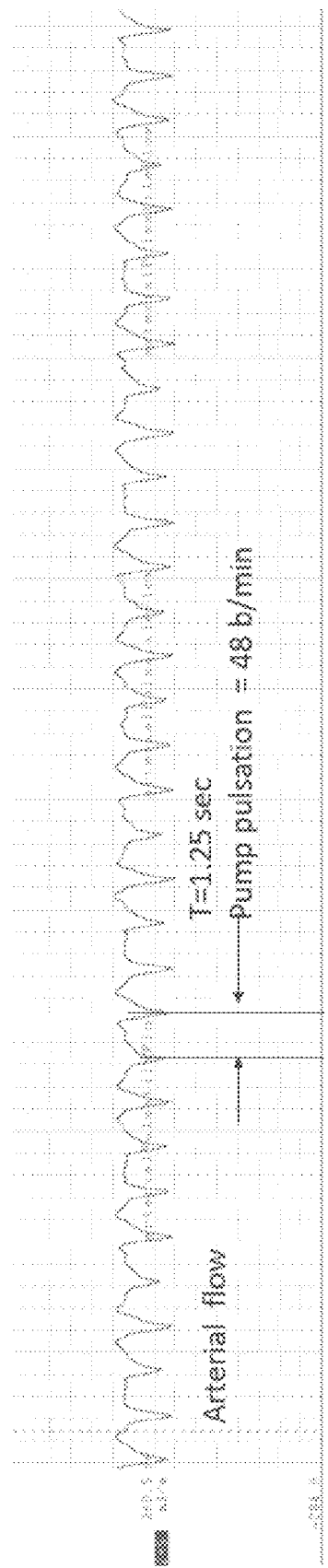
FIG. 3 is a graph of flow rate versus time in an arterial line in the extracorporeal circuit.

As seen in FIG. 3, the flow rate in the arterial line 120 is pulsatile and dominated by the flow variations imparted by the pump 170, if the pump is of the peristaltic or roller-pump type. The pulsation of approximately 48 beats/minute by the pump 170 can also can be identified or known from the RPM of the pump or blood treatment device 130, if the pump is incorporated in to the blood treatment device.

It has been found that a spectrum analysis of the flow rate data in the venous line 150, identifies various contributions, including a pump contribution on the pulsatile flow rate imparted by the pump 170 in the extracorporeal circuit 100, and the patient contribution. Generally, the flow rate data, such as the measured flow rate is analyzed to identify a magnitude of an input signal versus frequency within the full frequency range, so that the spectral components can be independently identified, and particularly the spectral components resulting from patient physiology, the patient contribution. The frequency domain provides for the identification of harmonic content in the flow rate data, such as the measured flow rate in the venous line 150, and thus provide for the identification of respective contributions to the pulsatile flow rate, including a patient contribution such as corresponding to a pulse or respiration rate of the patient.

Generally, the present disclosure provides for acquiring sufficient flow rate data that allows for accurately quantifying or distinguishing the components of the flow rate data, and particularly in the frequency domain of the flow rate data. For example, the flow rate data as a function of time is obtained at sufficiently short time intervals to model each oscillation, variation, pulsation or frequency change and over a sufficient period such that multiple occurrences are included. The controller 180 then decomposes the flow rate data on the hypothesis that the acquired signal is composed of a sum of individual oscillatory components. Thus, the controller 180 decomposes functions depending time into functions depending on spatial or temporal frequency, whereby the patient contributions to the resolved frequencies can be identified.

In one configuration, the spectrum analysis can be provided by Discrete Fourier Transform (DFT) and particularly the Fast Fourier Transform (FFT). The DFT interprets or transforms a time domain function into a series of sine-waves at various frequencies, the sum of which can reconstruct the signal. The so-called spectrum of frequency components is the frequency-domain depiction of the signal (such as the measured flow rate and the pulsatile pattern of the flow waveform or flow rate data). The frequency analysis provides a different way of looking at the same flow rate data of the flow in the venous line 150. Instead of observing the flow rate data, or the flow rate in the time domain, the frequency analysis decomposes time data in its series of sine waves. The (FFT) is a well-known mathematical method for transforming a function in time into a function of frequency. A commercially available spectrum analyzer or a software application in the controller 180 converts the flow rate data, such as the measured magnitude pattern of an input signal into its frequency components within the full frequency range.

Figure 4:
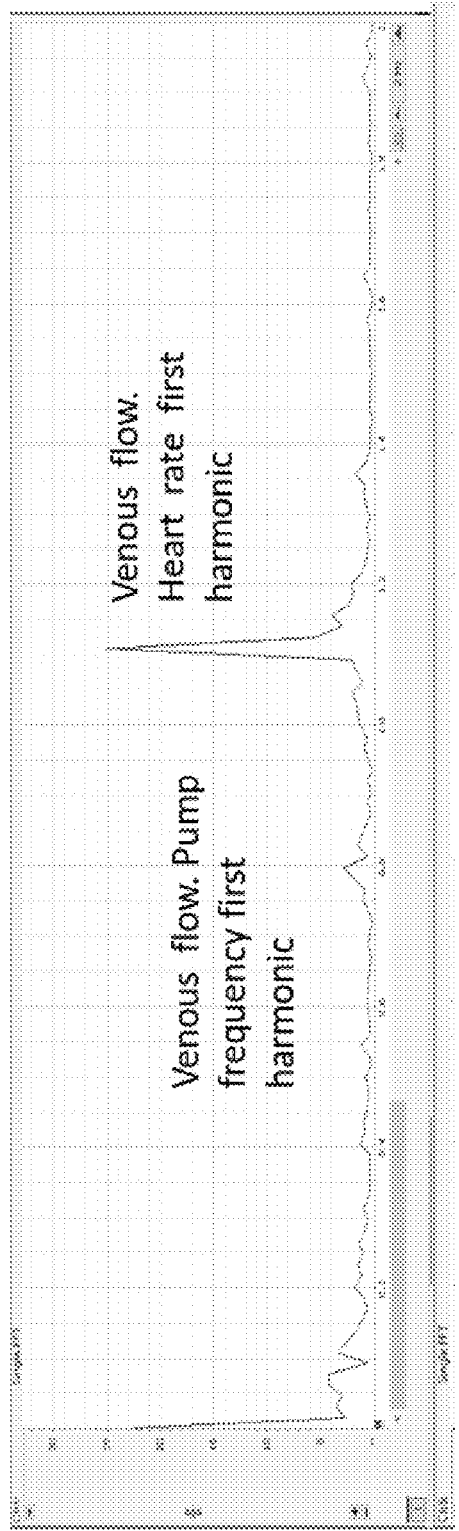
FIG. 4 is a graph of frequencies from a spectrum analysis of the measured flow rate in the venous line of the extracorporeal circuit.

Referring to FIG. 4, which is a FFT of the venous flow rate data of FIG. 2, a first harmonic of the pump frequency derived from the flow rate data in the venous line 150 is shown. Also shown in the FIG. 4, is a first harmonic of the heart rate of the patient connected to the extracorporeal circuit 100 as derived from the flow rate data in the venous line 150, thus showing the presence of the patient contribution can correspond to the pulse of the patient.

Figure 5:
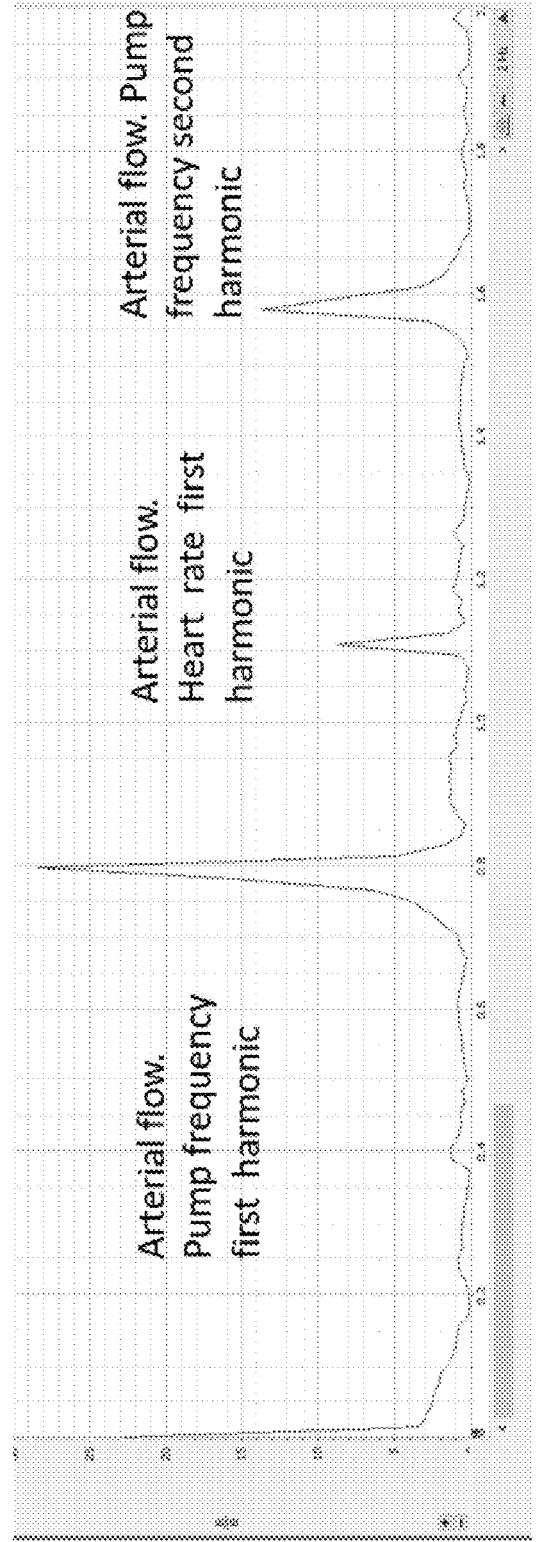
FIG. 5 is a graph of frequencies from a spectrum analysis of the measured flow rate in the arterial line of the extracorporeal circuit.

Referring to FIG. 5, which is a FFT of the arterial flow rate data FIG. 3, a first and second harmonic of the pump 170 is shown. It is also contemplated that this harmonic also can be known or derived from the operating parameters of the pump 130, such as revolutions per minute of the pump. It is also noted, the heart rate harmonic is also observed in the arterial flow rate data. However, it is understood that in the case of flow disruption between the venous line 150 and the patient circulatory system 30, such as venous needle dislodgement, the heart rate harmonic in the arterial line 120 will still remain or be present, as the signal propagates from arterial access of the arterial line.

Figure 6:
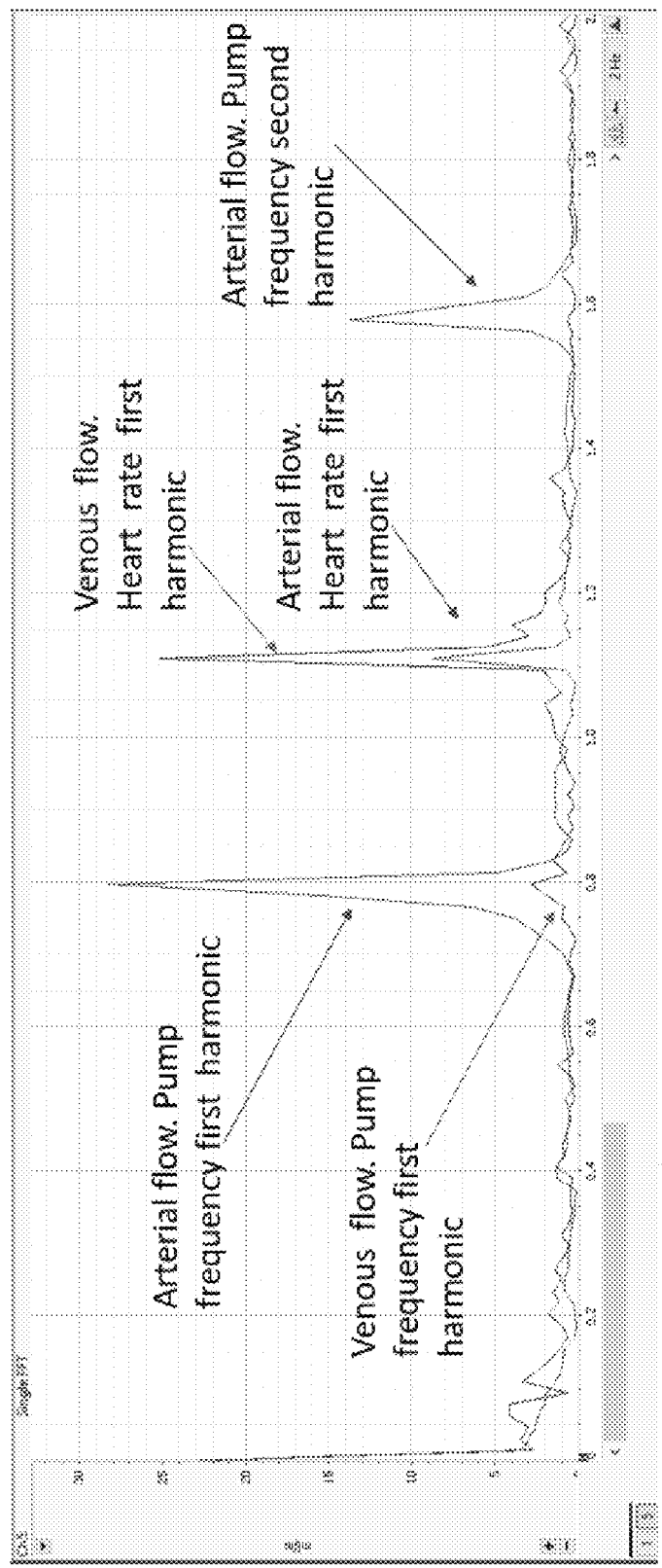
FIG. 6 is a graph of frequencies from a spectrum analysis of the measured flow rate in the arterial line and the venous line of the extracorporeal circuit.

Referring to FIG. 6, which combines the arterial and venous flow rate data, the spectrum analysis via FFT confirms, that the patient contribution, the heart rate, and the contribution from the pump 170 are observed by both flow sensors, that is the flow senor 126 in the arterial line 120 and the flow sensor 156 in the venous line 150.

Thus, the controller 180 is configured to apply the spectrum analysis to the flow rate data, such as a calculated or measured flow rate in the venous line 150, to identify at least one patient contribution to the flow rate data. By then monitoring the identified patient contribution, the controller 180 can provide an alarm or pump control in response to a change in, such as a termination of, the patient contribution.

While the Fourier Transform is set forth for the decomposition of the acquired flow rate data, it is understood that other ways of signal analysis can be used to extract information from the flow rate data about presence of the patient contribution to the flow rate data in the extracorporeal circuit, such as in the venous line 150 and particularly the patient contribution from the patient physiology for the monitoring of the presence of the patient contribution in the venous line.

Figure 7:
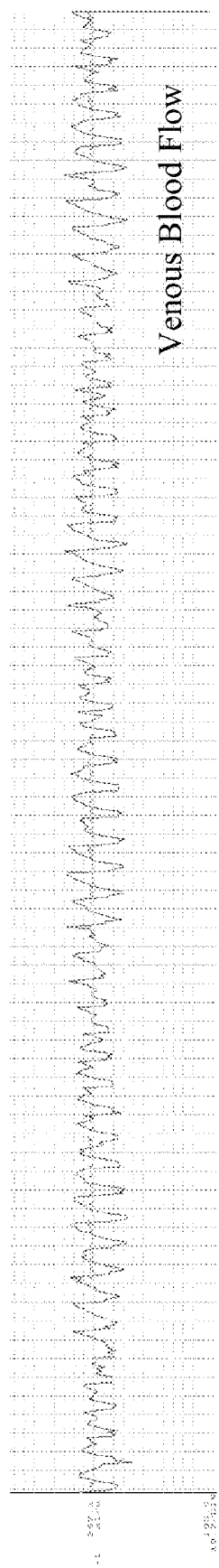
FIG. 7 is a second graph of flow rate versus time in a venous line in the extracorporeal circuit.
Figure 8:
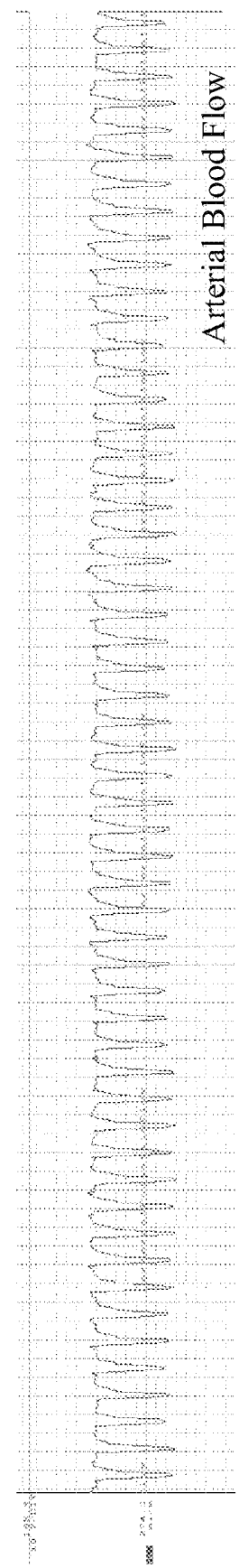
FIG. 8 is a second graph of flow rate versus time in an arterial line in the extracorporeal circuit.
Figure 9:
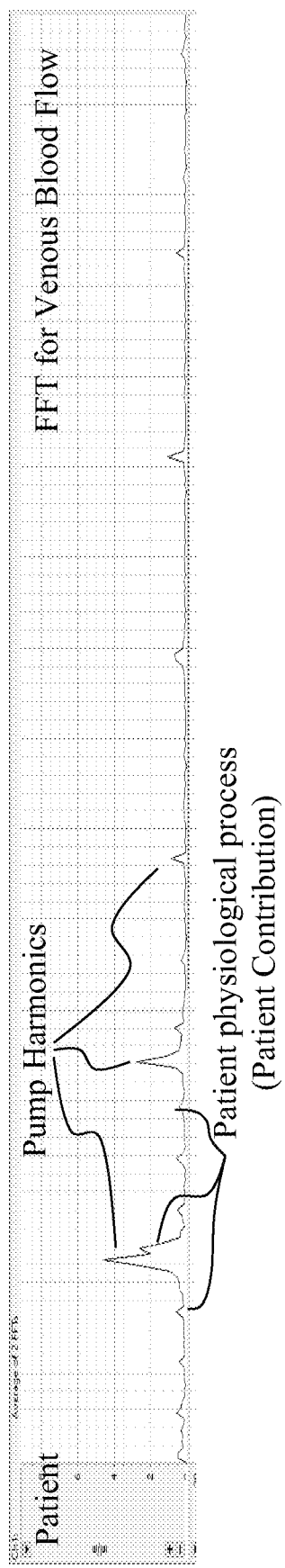
FIG. 9 is graph of frequencies from a spectrum analysis (FFT) of the measured flow rate in the venous line of the extracorporeal circuit of FIG. 7 showing harmonics from the physiology of the patient.
Figure 10:
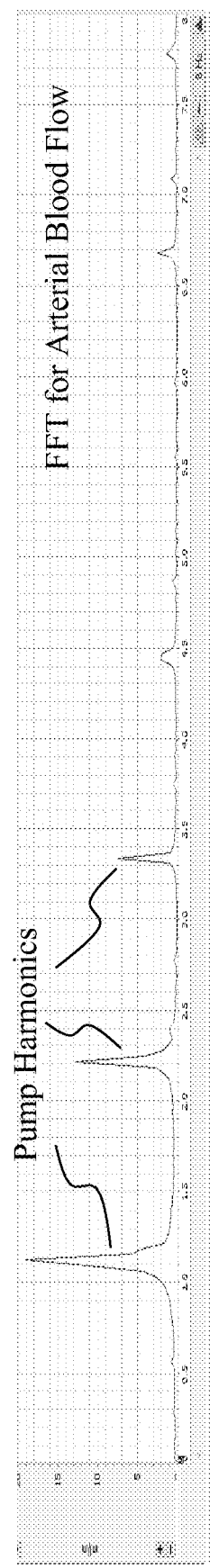
FIG. 10 is graph of frequencies from a spectrum analysis (FFT) of the measured flow rate in the arterial line of the extracorporeal circuit of FIG. 8.

Referring to FIG. 7, the flow rate in the venous line 150 is shown, wherein the flow rate includes a pulsatile component. FIG. 8 is a graph of the flow rate in the arterial line 120 of the extracorporeal circuit 100 of FIG. 7. FIG. 9 is a spectrum analysis of the flow rate data, specifically the flow rate, of FIG. 7. As seen in FIG. 10, the harmonics from the pump 170 are pronounced and are the dominate harmonics. Referring to FIG. 9, while the harmonics from the pump 170 are the dominate harmonics, the harmonics from the patient physiological process, the patient contribution, are identifiable. That is, harmonics from downstream physiological processes are identified in the blood flow rate in the venous line 150. Thus, the controller 180 can monitor for an absence or change of a predetermined amount of the patient contribution to detect a disruption of the flow from the venous line 150 of the extracorporeal circuit 100 to the patient blood delivery site, such as the vascular device 200.

Thus, the system can be configured to monitor the extracorporeal circuit 100 extending from the access device 200 through the extracorporeal blood treatment device 130, such as a dialyzer, and back to the access device, wherein the extracorporeal circuit includes the arterial line 120 extending from the access device to the blood treatment device, the venous line 150 extending from the blood treatment device to the vascular access, and the pump 170 connected to the extracorporeal circuit to pump blood from the access device, through the extracorporeal circuit from the arterial line, through the blood treatment device and through the venous line to the access device. The system includes the flow sensor 156 for obtaining flow rate data of a blood flow in the venous line 150; and the controller in communication with the flow sensor, wherein the controller 180 is configured to determine, based on the flow rate data, a flow rate in the venous line; identify, in the determined flow rate, at least one patient contribution to the flow rate from a downstream patient physiological process, such as by spectrum analysis and particularly FFT; and detect, based at least partly on the identified patient contribution, a disruption of the extracorporeal blood circuit downstream of the pump 170. That is, the controller 180 can be configured to identify an absence of a previously identified patient contribution as seen in the spectrum analysis. This identified absence from the spectrum analysis can be used to identify a disruption of the flow from the extracorporeal circuit 100 to the access device 200 (or the circulatory system 30), wherein an alarm is provided and/or the pump 170 is stopped. As set forth above, it is understood the disruption can include VND as well as ABLS.

In addition to the transforms set forth above that provide frequency components and hence comparison or monitoring of the frequency components, it is understood that as Fourier analysis requires a continuous waveform, it is contemplated that selected data points can be obtained wherein the controller 180 then applies a predictive model, such as but not limited to an AI algorithm, to the separate data points to generate for example, a predictive pattern of the waveform, wherein the disruption can be identified as soon as a change is seen in the time domain. Thus, the controller 180 can identify changes in the patient contribution in either the frequency domain and/or the time domain. Further, it is contemplated the controller 180 can also identify a change in a correlation between either obtained or predicted the flow rate data from either or both the arterial line and the venous line, such as the flow wave form pattern and the next obtained or predicted pattern, such as emerging by the next heartbeat.

The controller 180 can be configured to improve the identification of the patient physiological parameter (or a plurality of patient physiological parameters) in the flow rate data from the blood delivery (venous) line 150, such as by the correlation of flow rate data between the blood delivery (venous) line and the blood withdrawal (arterial) line 120. For example, one flow sensor 156 is operably connected to the blood delivery (venous) line 150 to generate blood delivery line flow rate data and a second flow sensor 126 is operably coupled to the blood withdrawal (arterial) line 120 to generate blood withdrawal line flow rate data, wherein the controller is configured to identify at least one patient physiological parameter (patient contribution) or a change in the patient physiological parameter through a relationship of the flow rate data from the blood withdrawal line and the flow rate data from the blood delivery line. In one configuration, the relationship is a correlation of the flow rate data from the blood withdrawal line and the flow rate data from the blood delivery line.

It is further understood that the controller 180 may receive information from the blood treatment device 130 and or the pump 170, such as a blood flow or revolutions per minute setting, so as to discern between transform (Fourier) components in the obtained flow rate data, thereby distinguishing between flow rate data generated by the pump 170 and by the patient contribution to the flow rate data, such as by the heart rate of the patient.

It is contemplated the controller 180 is connected to the flow sensor 156, wherein the flow sensor senses a flow through the venous line 150. The controller 180 is configured to identify a change in blood flow in the extracorporeal circuit 100 downstream of the flow sensor corresponding to the disruption between the extracorporeal circuit 100 and the patient circulatory system 30. The change to the flow rate data, or the flow rate, in the venous line 150 can be detected as a change in the patient contribution to the flow signal as indicated by the change in the detected harmonics in its frequency spectrum. It has been further found that the disruption, and particularly the VND or ABLS may correspond to a spike-shaped change (spike) in the flow rate in the extracorporeal circuit 100, which is an inharmonic change in the flow rate, and particularly an inharmonic increase in the flow rate. It is believed the spike in the flow rate corresponding to the disruption, and particularly the VND or ABLS may be in response to either exposure of the venous line 150 to atmospheric pressure, a change in the resistance to the blood flow, or a combination of both. That is, the temporary spike in the flow rate in the extracorporeal circuit 100 may be in response to exposure of the venous line 150 to atmospheric pressure rather than the pressure in the access device 200, such as the venous access. It is further contemplated the temporary spike in the flow rate in the extracorporeal circuit 100 may be in response to the decrease of resistance to blood flow in the venous line upon the disruption of the extracorporeal circuit. Thus, the spike in flow rate may result from either the change in pressure exposed to the flow in the extracorporeal circuit 100, the decrease in resistance to the blood flow through the venous line 150, or a combination of these factors. The resulting spike in the flow rate in the extracorporeal circuit 100 will generally correspond to an increase in flow sensed by venous flow sensor 156 (a positive-going spike), and a decrease in flow in the dialysate line outflow flow sensor 336 (a negative-going spike), as the total volume inside a dialyzer compartment of the dialyzer 130 will remain constant during the period of such a flow spike.

With respect to the spike in the flow rate being at least partly due to a decrease in flow resistance, it is noted that similar to the case of a central catheter, a venous catheter tip of the venous line 150 may be located proximate to the right atria of the heart in the patient circulatory system 30. When the venous line 150 is intentionally disconnected, such as along the line connected to the venous catheter, the spike in the flow rate is observed in the extracorporeal circuit 100 as the resistance to flow (from the catheter lumen) decreases. Thus, it is contemplated that the steps of detecting the spike in flow rate in the venous line 150 can accommodate the specific contributions or characteristics of any associated blood treatment device in the extracorporeal circuit 100.

Figure 11:
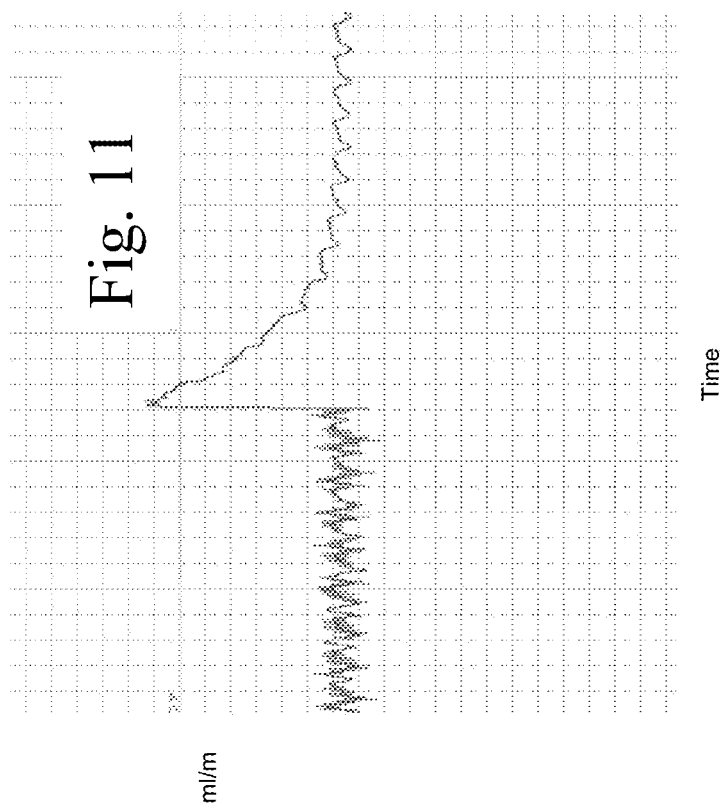
FIG. 11 is a graph showing an inharmonic change, such as a spike, in flow rate in the venous line of the extracorporeal circuit upon venous needle dislodgment.

Referring to FIG. 11, a bench simulation of VND using a hemodialysis tubing set and hardware is shown, where the flow rate data from the venous line 150 may include the spike in flow rate as an inharmonic component or change. In FIG. 11, the spike in the flow rate in the venous line 150 corresponds to a VND. That is, the flow rate data may include an inharmonic change (such as an increase) in the blood flow rate which is not identified as a change of any harmonic patient contributions to the flow rate signals measured before and after the occurrence of the spike. In the general case, the spike, or inharmonic change, in the flow rate may correspond to a VND or ABLS. It is hypothesized, that the flow rate increase from the mean flow rate before the spike to the inharmonic pattern observed during the spike may be generated by a changed pressure at the end of the disconnected venous needle or disconnected catheter or any other blood line disconnect, between the flow rate sensor and the patient. Alternately, it is further hypothesized the flow rate increase from the mean flow rate before the spike to the inharmonic pattern observed during the spike may be generated by a changed resistance to flow within the extracorporeal circuit 100 and particularly in the venous line 150 distal from disconnect location, or a combination of both changed pressure and resistance to flow. In these two situations of change in pressure and change in resistance, while such changes do coincide with a disappearance of a harmonic patient contribution to the measured rate of flow, the VND or ABLS is not concluded from a change in the measured harmonic patient contribution to the flow before the disruption event, but from a temporal, inharmonic change to the mean flow level starting with an unusual spike in the measured rate of flow.

While the spike in flow rate shown in FIG. 11 corresponds to venous needle dislodgement, it is contemplated that not all spikes in the flow rate in the venous line 150 correspond to or are indicative of the disruption, such as VND or ABLS. That is, a spike in the flow rate in the extracorporeal circuit 100, such as the venous line 150, may correspond to a movement of the patient or to another source such as electronic or electromagnetic noise, rather than the disruption, such as the VND or ABLS.

To address this issue, in one configuration, the controller 180 is configured to apply a threshold (or predetermined level) to the magnitude of the flow spike (the inharmonic change in the flow rate) in the venous line 150, wherein the flow spike greater than the threshold (or predetermined level) is deemed a possible disruption of flow between the extracorporeal blood circuit 100 and the patient circulatory system 30, such as VND or ABLS, and the flow spike less than the threshold is not deemed the possible disruption. It is believed the size and shape of the flow spikes will be strongly device specific. It is contemplated that in a dialysis treatment configuration such as simulated in FIG. 11, the threshold may be between 15 ml/min and 30 ml/min. Alternatively, the threshold may be terms of a percentage change in the flow rate over a predetermined time (or within or less than a given time). For example, a change in the flow rate of at least 5%, or 10% or more within less than a second or less than a few seconds, may be used to identify the rising slope of the flow spike that needs to be further examined to conclude the spike is associated with disruption between the extracorporeal blood circuit 100 and the patient circulatory system 30, such as ABLS or VND. It is contemplated the disruption detection algorithms can be developed from bench simulations, in view of the limitations on obtaining actual patient disruption data.

Referring to FIG. 11, the spike in the flow rate, (inharmonic change in the flow rate), in the (blood delivery) venous line 150 is shown compared to a relatively constant average blood flow in the line, in which a very sharp increase in blood flow rate can be observed. A peak value of the spike in the flow rate is greater than the pump-generated pulsations of the flow rate in the venous line 150, as well as being greater than any variation in flow rate that may derive from heart pressure variations from the patient at the end of the venous line 150.

Generally, an increase in flow rate (positive) spike generated by a movement of the patient or by another source such as electronic or electromagnetic noise is preceded or followed by a corresponding decrease (negative) spike, which are distinct from the spike in the blood flow rate shown in FIG. 11 which has an inverse, or reverse, sawtooth shape, having a sharp increase followed by downward ramp to substantially the prior average flow, or within a percentage as set forth below. The slope of the increase in the flow rate will be determined, mostly, by the low-pass bandwidth of the flow sensor 156. The spike in the flow rate is a substantially instantaneous reaction observed when the fluid communication between the extracorporeal circuit 100 and the access device 200 (or the patient circulatory system 30) is broken, and particularly with the venous line 150 is no longer connected to the patient, such as the access device. The downward ramp of the spike in the flow rate can have a generally exponential decay in the flow rate, where the flow rate returns to a level prior to the spike, or within 5%, or 10%, or 25% of the flow rate prior to the spike. Therefore, the controller 180 connected to the flow sensor 156 can positively differentiate a spike generated by a disruption between the extracorporeal blood circuit 100 and the patient circulatory system 30 from a spike in the flow generated by a movement of the patient or by another source such as electronic or electromagnetic noise, by tracking a baseline level of the mean flow, and integrating the "area under the blood flow signal curve" above the mean flow baseline level immediately following the flow spike. For a dialysis tubing set and hardware circuit deployed for generating the data of FIG. 11, the duration of the flow spike signal to the point where the sawtooth decay returns to its earlier peak flow level is approximately 7 seconds, and the area under the curve of the spike in the flow curve over that 7 second time, the integral, is a blood volume of approximately 3.5 mL. Therefore, for the dialysis tubing set and hardware circuit deployed for generating the data of FIG. 11, the controller 180 may be configured to have a trigger level as a combination of integration time and corresponding area under the curve, such as for example an integration time of up to 7 seconds and blood volume up to 3.5 mL, to positively identify the disruption between the extracorporeal blood circuit 100 and the patient circulatory system 30 based on this blood volume integration. It is contemplated the trigger level could be 1 mL for an integration over the first 3 seconds, or 1.5 mL over 5 seconds, or another time and volume at least partly depending on the respective blood treatment device and the associated tubing set. Alternatively, the controller 180 could be configured to assess the flow spike in view of additional parameters such as tracking the time (duration) that the spike remains above a threshold (or predetermined) level. Further, the controller 180 could be configured to project or estimate the full exponential decay of the spike from a trajectory during the first one or more seconds after the spike and then estimate the full area under the curve of the spike, thereby facilitating a relatively fast analysis and response to a potential disruption, such as VND, ABLS or other disruption having implications to patient well-being. It is believed the blood flow rate after return from the spike in the flow rate is at least partially determined by the type of pump 170. In the FIG. 11, the pump 170 is a constant-output roller pump, and the measured flow rate will therefore return to a value close to what was measured before the start of the spike. If the pump 170 were a centrifugal pump, the flow rate after the disruption, such as the VND or ABLS, may return to a slightly higher flow rate than prior to the disruption, such as within the percentages set forth. It is believed that volume changes of the extracorporeal circuit 100 and other components between the constant-flow pump 170 and the flow sensor may contribute to the exponential decay in flow following the spike.

Again referring to FIG. 11, an area under the curve of the spike and its exponential decay is relatively small, approximately 3.5 mL. The volume of blood exceeding the mean flow as sensed by the flow sensor 156 during the first second of the spike is around 0.7 mL—around 20 drops of blood. Therefore, the detection of the disruption, such as VND or ABLS requires a low-noise, high-resolution flow sensor with a flow response bandwidth of 5 Hz or 10 Hz. It is recognized, the total amount of blood spilled at the end of the venous line 150 in the first second after the initiation of the disruption, (that during the first second following the positive spike) is substantially bigger: 1/60th of 330 mL/min=5.5 mL, plus the 0.7 mL volume of the spike. This monitoring approach of the disruption, such as ABLS or VND, relies on the high flow resolution of the flow sensor 156 and its flow detection algorithm to identify any changes in flow on short notice.

Figure 13:
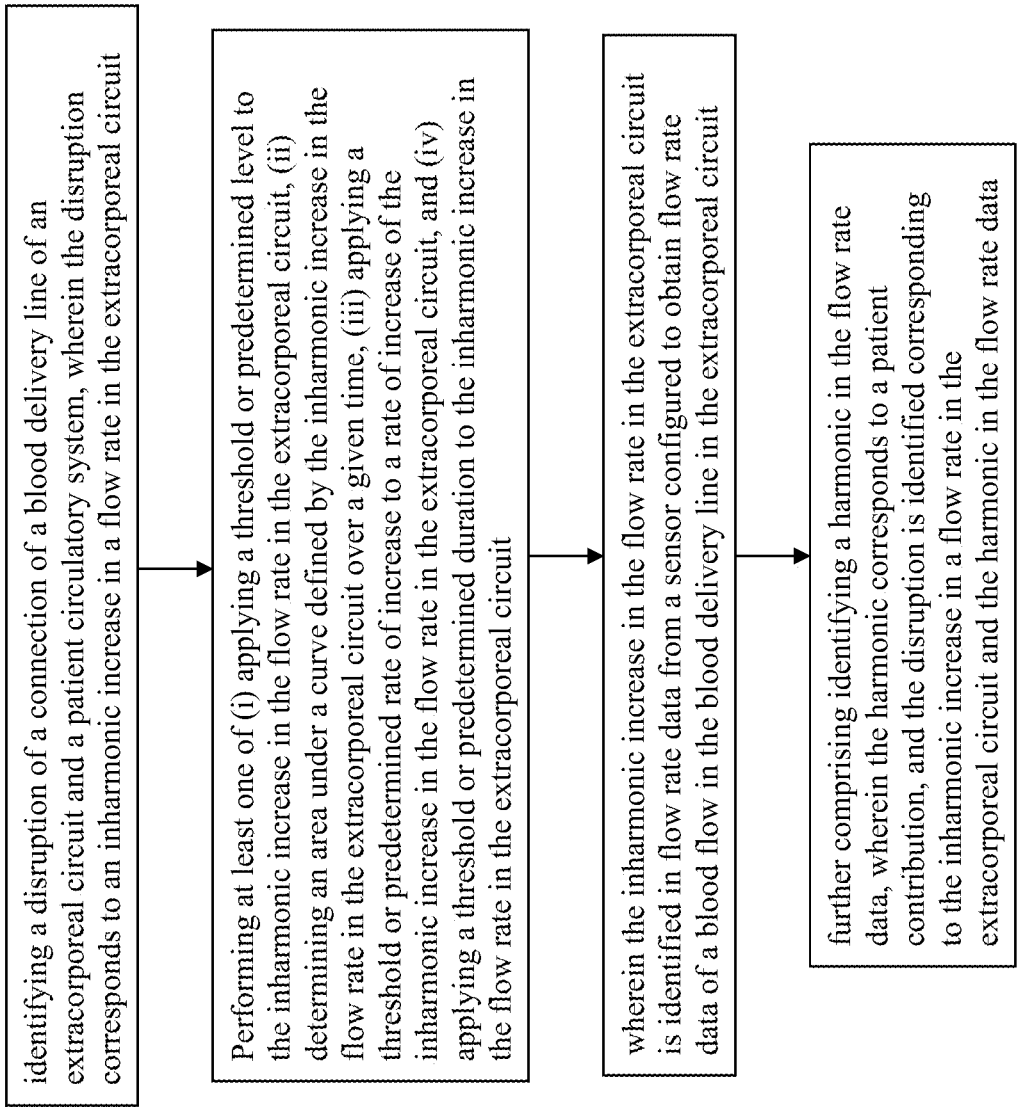
FIG. 13 is a flow chart of identifying a disruption between the extracorporeal circuit and the patient circulatory system.

Thus, as seen in FIG. 13, the presence of the inharmonic change in the flow rate, such as the spike in the flow rate in the venous line 150 may correspond to the disruption of the extracorporeal blood circuit 100, and particularly to VND or ABLS, and be used to terminate blood flow from the pump 170. This provides that the presence of the inharmonic increase, or spike, in the flow rate in the venous line 150 can be used to identify the disruption of between the extracorporeal blood circuit 100 and the patient circulatory system 30, such as particularly the VND or ABLS.

Figure 14:
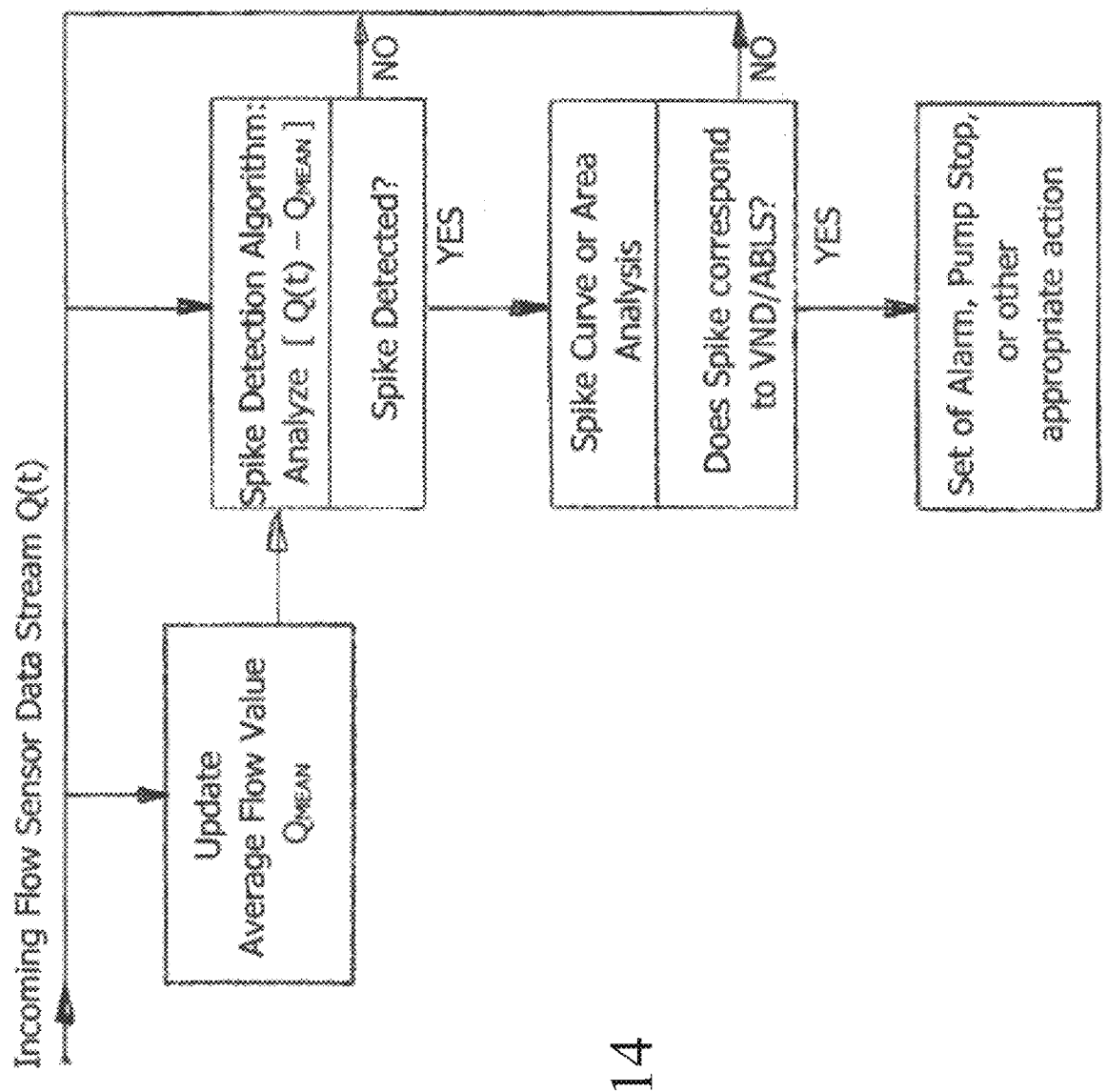
FIG. 14 is a flow chart of a configuration of the controller for identifying a disruption between the extracorporeal circuit and the patient circulatory system.

Specifically, referring to FIG. 14, the controller 180 can be configured to monitor a flow rate, such as an average flow rate in the extracorporeal circuit, such as the venous line 150, and updating the average flow on a periodic basis. The periodic basis can range from tenths of a second to a second, two seconds, three seconds, or five seconds or more. The spike can be detected by comparing the flow rate as a function of time to an average flow rate, such as by subtracting the average flow rate from a or the most recent flow rate as a function of time. Depending on the difference between the current flow rate and the average flow rate, the detection of a spike can be determined. If no spike in the flow rate is detected, the controller 180 continues to monitor the flow rate and update the average flow rate. Conversely, if a spike is detected, the controller 180 can then calculate an area under the curve of the spike or determine the shape of the spike as compared to know disruptions, thus determining if the spike corresponds to a disruption between the extracorporeal circuit 100 and the patient circulatory system 30, such as VND or ABLS.

It is contemplated the presence of the spike in the flow rate in the extracorporeal circuit 100, such as the venous line 150, can be used alone or in combination with the patient contribution identified in the spectrum analysis of the flow rate data (or at least one of the identified patient contribution harmonics in the flow rate data) to identify with more certainty the disruption between the extracorporeal circuit 100 and the patient circulatory system 30, and particularly the VND or ABLS.

Thus, the controller 180 can be configured to identify the disruption between the extracorporeal circuit 100 and the patient circulatory system 30, and particularly the VND or ABLS based on, or from the identified inharmonic in the flow rate in the extracorporeal circuit, or the patient contribution harmonic identified in the flow rate data, or a combination of the inharmonic and the patient contribution harmonic. It is believed that by using both the inharmonic increase and the (lack of) patient contribution harmonic in the flow rate data that the incidence of a false positive identification of the disruption between the extracorporeal circuit 100 and the patient circulatory system 30, and particularly the VND or ABLS, can be reduced.

It is further contemplated the flow rate in the extracorporeal circuit 100 may be monitored or measured on the dialysate side 302 of the blood treatment device 130, such as the dialyzer shown in FIG. 1. It is contemplated the flow rate in the extracorporeal circuit 100 can be identified from the dialysate flow rate, since a pressure increase at the blood side of the dialyzer 130 creates a blood volume increase inside the fibers of the dialyzer 130 which is offset by a volume change of the dialysate surrounding the fibers of the dialyzer and inside the frame of the dialyzer 130 as a decrease. Conversely, a negative spike in the flow rate in the dialyzer 130 would decrease the volume inside the fibers of the dialyzer, which decrease would be offset by an increase in the volume of dialysate surrounding the fibers of the dialyzer and inside the frame of the dialyzer. This volume change of the dialysate may be monitored by the controller 180 from the simultaneous measurement of dialysate flows into and out of the dialyzer 130, such as by the dialysate inlet flow sensor 326 sensing the flow in the dialysate inlet line 320 and the dialysate outlet flow sensor 336 sensing the flow in the dialysate outlet line 330, then by the controller subtracting these measurements, and by deriving dialysate volume changes by integrating their differences over a given time, following the registration of a spike in dialysate flow. It is further contemplated that because the dialysate flow of the dialyzer inlet line 320 is generated by the pump 340 such as a roller pump with an output flow rate mostly independent of the pressure at an outlet of the pump, the volume change of the dialyzer 130 may be simply measured by integrating the change in dialyzer outlet line flow recorded by the dialysate outlet flow sensor 336 over time, following the registration of a spike in dialysate flow recorded by the flow sensor 336. The registered spike in the flow rate of the dialysate and its associated volume change may be used alone or in conjunction with the identified patient contribution harmonics, and or the identified inharmonic in the blood delivery line 150 to detect the disruption between the extracorporeal blood circuit 100 and the patient circulatory system 30, such as the VND or ABLS. Thus, the present disclosure contemplates identifying a disruption of a connection of a blood delivery line of the extracorporeal circuit 100 and the patient circulatory system 30, wherein the disruption corresponds to an inharmonic decrease in a flow rate in the dialysate flow in the dialysate outlet line 330 of the blood treatment device 130. The controller 180 can be in communication with the dialysate outlet flow sensor 336 or with both the flow sensors 326 and 336, wherein the controller is configured to (i) detect, based at least partly on an inharmonic change in the flow rate of the dialysate at least out of, or into and out of the blood treatment device 130, a disruption between the extracorporeal circuit 100 and the patient circulatory system 30.

As set forth above, the extracorporeal circuit 100 can be a blood treatment circuit such as the dialyzer 130, and configured to provide controllable transfer of solutes and water across a semi permeable membrane separating flowing blood and dialysate streams as well as extracorporeal life support, such as extracorporeal membrane oxygenation (ECMO). Thus, in an ECMO circuit, the flow sensor 156 may sense the blood flow in the blood delivery line 150 for detecting a spike in the blood flow rate, wherein the spike is used to identify a disruption in blood flow or return to the patient and thus impart a control of the pump 170 in the extracorporeal circuit 100.

Thus, the flow rate data may include an inharmonic component, such as the spike or temporary increase in the flow rate, and a harmonic component from a patient contribution in the flow rate data and where the controller 180 is configured to identify the disruption of the connection of the extracorporeal blood circuit 100, and particularly the VND or ABLS corresponding to (i) at least one inharmonic component in the flow rate, or (ii) at least one harmonic component in the flow rate, or (iii) a combination of the harmonic component and the inharmonic component in the flow rate.

In select configurations, the inharmonic change in the blood flow rate within the extracorporeal circuit 100, and particularly the blood delivery line 150 is a temporary increase in the measured or local blood flow rate. Thus, the controller 180 can be configured to identify an increase in the blood flow rate of at least 1 mL for the integration over the first 3 seconds, or 1.5 mL over 5 seconds, or another volume and corresponding time at least partly depending on the respective blood treatment device and the associated tubing set, which is used to identify a disruption of the extracorporeal blood circuit 100, and particularly to VND or ABLS.

The present system provides a method including the steps of identifying a disruption between the venous line 150 of the extracorporeal circuit 100 and the patient circulatory system 30, such as via the access device 200, wherein the disruption corresponds to a change in pressures in, and associated step-wise change in volumes of, or flow rates through one of the venous line 150 and dialyzer 130.

The present system provides a further method including identifying at least one patient contribution, from a downstream patient physiological function, of the measured flow rate in the venous line 150 of an extracorporeal circuit 100; and monitoring a change in the patient contribution to identify a disruption of vascular access between the extracorporeal circuit 100 and the circulatory system 30 following a spike in the measured flow rate. The monitoring can include a rate of change in the measured flow rate as well as an absence of presence of an identified harmonic in the measured flow rate relative to a predetermined level or threshold.

The methods of the present disclosure include measuring the flow rate in the venous line 150 and identifying a disruption of the connection of the venous line and the circulatory system 30 of the patient corresponding to a change of a component of the flow rate, which component corresponds to a physiological parameter of the downstream circulatory system connected to the venous line. The change in the component can be detected by the corresponding change in the spectrum analysis of the measured flow rate in the venous line 150. Thus, the change in the component can be detected by the corresponding change in a harmonic in the spectrum analysis of the measured flow rate in the venous line 150.

The methods of the present disclosure further include measuring the flow rate in the venous line 150 and identifying a disruption of the connection of the venous line and the circulatory system 30 of the patient corresponding to a change of a component the flow rate, which component corresponds to a parameter of the downstream circulatory system connected to the venous line, such as a patient mean pressure, heart rate, or respiratory rate. The change in the component can be detected by a corresponding instantaneous change in the measured flow rate in the venous line 150 or the dialysate line 330. Thus, the change in the component can be detected by the corresponding instantaneous change of an inharmonic spike in flow, and may be further detected by the disappearance of an identified harmonic pattern in the measured flow rate.

Thus in one configuration, the present disclosure provides for monitoring the extracorporeal blood treatment device 130 in the extracorporeal circuit 100, wherein the extracorporeal circuit includes the arterial line 120 with the arterial patient connection and the venous line 150 with the venous patient connection, the dialyzer 130 and associated dialysate circuit 310 with the pump 340, the dialysate delivery line 320, and the dialysate return line 330, and the pump 170 for conveying blood in the extracorporeal circuit. The method includes measuring the flow rate in at least one of the venous line 150 of the extracorporeal circuit 100 or the flow rate in the dialysate outlet line 330; identifying at least one patient contribution of the measured flow rate corresponding to a downstream physiological parameter of the patient; and determining the presence of a disruption in the flow between the extracorporeal circuit 100 and the circulatory system 30 in response to a change in the patient contribution to the measured flow rate. In identifying the change in the patient contribution, data analysis of the measured flow may include calculating a mean flow (rate) and spikes in the mean flow, flow volumes established by integrating changes over a given time in the mean flow following a spike in flow, spectrum analysis to identify frequencies corresponding to the downstream physiology of the patient, and thus a given change in the identified flow pattern can trigger and alarm or stop the pump 170.

The present disclosure provides a method for determining when a disruption occurs in the flow from the extracorporeal circuit 100 to the patient circulatory system 30 by identifying a corresponding spike in a flow of dialysate from the blood treatment device 130, and particularly with the spike is a decrease in the flow of dialysate from the blood treatment device, and more particularly when the spike in a flow of dialysate from the blood treatment device is accompanied by at least one of a spike in the flow rate in the blood delivery (venous) line 150, or a change in a patient contribution to the flow in the blood delivery line. Thus, the present disclosure contemplates the controller 180 connected to at least the dialysate outlet flow sensor 336 in the dialysate circuit 310 and configured to identify the disruption corresponding to a spike in the dialysate flow rate, and particularly a spike reduction in the dialysate flow rate in the dialysate return line 330, wherein the controller can be configured to employ an inharmonic in the flow rate in the venous line 150 and/or a harmonic in the blood flow rate in the extracorporeal circuit to identify or confirm the disruption.

The present disclosure sets forth systems and methods for determining when a disruption occurs in the flow from the extracorporeal circuit 100 to the patient circulatory system 30, such as when a needle or cannula has been removed from the patient, or when the connection of the blood treatment device 130 to the venous needle or to the venous catheter lumen is disrupted, such as disconnected. That is, the disruption of the flow from the extracorporeal circuit 100 to the patient circulatory system 30 includes a disruption of the flow in the extracorporeal circuit downstream of the pump 170. For example, the disruption can be an interruption of the flow from the pump to the venous line 150, or from the blood treatment device 130 to the venous line, as well as the between the venous line and the patient access, or the patient access 200 to the circulatory system 30.

One primary use for the systems and methods is with blood treatments that remove blood from the patient, treat the blood and return the treated blood to the patient. As set forth above, typical blood treatments include hemodialysis ("HD"), hemofiltration ("HF"), hemodiafiltration ("HDF") and continuous renal replacement treatment ("CRRT") systems each remove blood from the patient, filter the blood, and return the blood to the patient. However, it is understood that besides these blood treatments, the access disconnection systems and methods discussed herein could be used in cardio pulmonary bypass surgeries in which blood is removed from the patient, oxygenated, and returned to the patient. Further, the disruption detection can be used with single needle systems, such as certain medical delivery systems in which a drug or medicament is infused from a source to the patient. Additionally, the disruption detection can be used in single or double needle aphaeresis or other blood separation and/or collection systems, such as for separating platelets, plasma, red cells or cell subpopulations.

The present disclosure thus provides a method including (a) identifying a patient contribution, from a downstream patient physiological function in flow rate data from the blood delivery line 150 of the extracorporeal circuit 100; and (b) monitoring the patient contribution to identify the disruption of a flow between the extracorporeal circuit and the patient circulatory system 30. The method can further comprise generating alert/alarm upon identifying the disruption.

The present disclosure thus provides a method including (a) obtaining flow rate data of a flow in the blood delivery line 150 of the extracorporeal circuit 100, the extracorporeal circuit having the pump 170 imparting the flow in the blood delivery line; and (b) identifying a disruption of a connection of the extracorporeal circuit and a downstream patient circulatory system 30, the disruption corresponding to an inharmonic component of the flow rate data.

The present disclosure further provides a method for monitoring an extracorporeal blood treatment apparatus including the extracorporeal circuit 100, the extracorporeal circuit having the arterial line 120 with an arterial patient connection and the venous line 150 with a venous patient connection, and the pump 170 for conveying blood in the extracorporeal circuit, the method including the steps of (a) sensing blood flow rate data in the venous line of the extracorporeal circuit; (b) identifying a patient contribution of the sensed blood flow rate data corresponding to a downstream physiological parameter of the patient; and (c) determining a disruption of the connection of the extracorporeal circuit and the circulatory system 30 in response to a change identified in the patient contribution to the sensed blood flow rate data. The method can further include generating a control signal to activate an alarm unit, stop the pump 170, or both, after the step of determining the disruption is present.

This disclosure has been described in detail with particular reference to an embodiment, but it will be understood that variations and modifications can be affected within the spirit and scope of the disclosure. The presently disclosed embodiments are therefore considered in all respects to be illustrative and not restrictive. The scope of the invention is indicated by the appended claims, and all changes that come within the meaning and range of equivalents thereof are intended to be embraced therein.

The invention claimed is:

1. A system for detecting a disruption of a fluid connection between an extracorporeal circuit and a patient circulatory system, the system comprising
   (a) an extracorporeal circuit extending from a patient circulatory system through a patient blood withdrawal site to an extracorporeal blood treatment device and returning to the patient circulatory system through a patient blood delivery site, the extracorporeal circuit including a blood withdrawal line extending from a patient blood withdrawal site to the a blood treatment device, a blood delivery line extending from the blood treatment device to the a patient blood delivery site, and a pump configured to pump blood through at least a portion of the extracorporeal circuit;
   (b) a flow sensor configured to obtain flow rate data of a flow in a portion of the extracorporeal circuit; and
   (c) a controller in communication with the flow sensor, the controller configured to:
      i) identify an inharmonic change in the flow rate data; and
      ii) send a control signal if a disruption of the fluid connection between the extracorporeal circuit and the patient circulatory system is detected based at least partly on the identified inharmonic change in the flow rate data, the control signal configured to instruct the system to perform at least one of activating an alarm unit or stopping the pump.

2. The system of claim 1, wherein the flow sensor obtains the flow rate data from the blood delivery line.

3. The system of claim 1, wherein the flow sensor is a dialysate flow sensor configured to sense a flow in a dialysate line fluidly connected to the blood treatment device.

4. The system of claim 1, wherein the controller is further configured to detect the disruption corresponding to at least one of (i) the inharmonic change being an inharmonic increase and (ii) the inharmonic change being an inharmonic decrease in the flow rate data.

5. The system of claim 1, wherein the controller is further configured to detect the disruption corresponding to at least one of (i) the inharmonic change being an inharmonic increase in a blood flow rate having a rate of increase greater than a first predetermined rate and (ii) the inharmonic change being an inharmonic decrease in a dialysate flow rate having a rate of decrease greater than a second predetermined rate.

6. The system of claim 1, wherein the controller is further configured to detect the disruption corresponding to at least one of (i) the inharmonic change being an inharmonic increase maintaining an increase in a flow rate for a time longer than a predetermined time and (ii) the inharmonic change being an inharmonic decrease maintaining a decrease in a blood flow rate for a time longer than a second predetermined time.

7. The system of claim 1, wherein the controller is further configured to detect the disruption corresponding to an area under a curve of the inharmonic change for a given time.

8. The system of claim 1, wherein the controller is configured to identify a harmonic in the flow rate data, and detect the disruption corresponding to the identified inharmonic change and the identified harmonic.

9. The system of claim 1, wherein the disruption is one of a venous needle dislodgement and an access-bloodline separation.

10. The system of claim 1, wherein the controller is configured to stop the pump in response to the detected disruption.

11. The system of claim 1, wherein the controller is further configured to identify, in the obtained flow rate data, a patient contribution to the flow rate data and wherein the disruption of the fluid connection between the extracorporeal circuit and the patient circularly system is detected based at least partly on a combination of the identified inharmonic change in the obtained flow rate data and a change in or disappearance of a patient contribution harmonic identified in the obtained flow rate data.

12. The system of claim 1, wherein the flow sensor is configured to continuously monitor the presence of a patient contribution and a harmonic patient contribution in a portion of the extracorporeal circuit.

13. A method of detecting a disruption of a fluid connection between an extracorporeal circuit and a patient circulatory system the method comprising:
   (a) monitoring an extracorporeal circuit extending from a patient circulatory system through a patient blood withdrawal site to an extracorporeal blood treatment device and returning to the patient circulatory system through a patient blood delivery site, wherein the extracorporeal circuit comprises a blood withdrawal line extending from the patient blood withdrawal site to the blood treatment device, a blood delivery line extending from the blood treatment device to the patient blood delivery site, and a pump configured to pump blood through at least a portion of the extracorporeal circuit;
   (b) identifying an inharmonic change in flow rate data of a flow in a portion of the extracorporeal circuit;
   (c) detecting a disruption of the fluid connection of the blood delivery line of an extracorporeal circuit and the patient circulatory system, wherein the disruption corresponds to the identified inharmonic change in a flow rate in the portion of the extracorporeal circuit; and
   (d) sending a control signal upon the detecting of the disruption of the fluid connection of the blood delivery line of the extracorporeal circuit and the patient circulatory system, the control signal configured to instruct the performance of at least one of activating an alarm unit or stopping the pump.

14. The method of claim 13, wherein the inharmonic change in the flow rate in the extracorporeal circuit is identified in flow rate data from a flow sensor configured to obtain flow rate data of at least one of (i) a dialysate flow in passing from a blood treatment device in the extracorporeal circuit and (ii) a blood flow in at least one of a blood withdrawal line in the extracorporeal circuit and the blood delivery line in the extracorporeal circuit.

15. The method of claim 13, wherein the inharmonic change in the flow rate in the extracorporeal circuit is identified in flow rate data from a flow sensor configured to obtain flow rate data of at least one of (i) a dialysate flow in passing from a blood treatment device in the extracorporeal circuit and (ii) a blood flow in the blood delivery line in the extracorporeal circuit.

16. The method of claim 14, further comprising identifying a harmonic in the flow rate data, wherein the harmonic corresponds to a patient contribution.

17. The method of claim 14, wherein the disruption is one of a venous needle dislodgement and an access-bloodline separation.

18. The method of claim 13, wherein the step of monitoring an extracorporeal circuit further comprises the step of monitoring the presence of a patient contribution harmonic in the flow rate data.

19. The method of claim 18, further comprising the step of identifying the disappearance or change in the patient contribution harmonic and detecting the disruption of the fluid connection of the blood delivery line of the extracorporeal circuit and the patient circulatory system, wherein the disruption corresponds to a combination of the identified inharmonic change in a flow rate in the portion of the extracorporeal circuit and the disappearance or change in the patient contribution harmonic.

* * * * *